(12) United States Patent
Leiber

(10) Patent No.: US 12,187,252 B2
(45) Date of Patent: Jan. 7, 2025

(54) DEVICE FOR A HYDRAULIC ACTUATING SYSTEM

(71) Applicant: IPGATE AG, Pfäffikon/Sz (CH)

(72) Inventor: Thomas Leiber, Rogoznica (HR)

(73) Assignee: IPGATE AG, Pfaffikon (CH)

( * ) Notice: Subject to any disclaimer, the term of this patent is extended or adjusted under 35 U.S.C. 154(b) by 0 days.

(21) Appl. No.: 18/201,394

(22) Filed: May 24, 2023

(65) Prior Publication Data

US 2023/0294655 A1 Sep. 21, 2023

Related U.S. Application Data

(63) Continuation of application No. 16/626,909, filed as application No. PCT/EP2018/067429 on Jun. 28, 2018, now Pat. No. 11,685,355.

(30) Foreign Application Priority Data

Jun. 29, 2017 (DE) ...................... 10 2017 114 556.7

(51) Int. Cl.
*B60T 13/74* (2006.01)
*B60T 13/68* (2006.01)
(Continued)

(52) U.S. Cl.
CPC .......... *B60T 13/745* (2013.01); *B60T 13/686* (2013.01); *B60T 8/4081* (2013.01); *B60T 8/4872* (2013.01); *B60T 13/662* (2013.01); *B60T 2270/82* (2013.01)

(58) Field of Classification Search
CPC .... B60T 13/745; B60T 13/686; B60T 13/662; B60T 8/4081; B60T 8/4872; B60T 2270/82; B60T 2270/84
See application file for complete search history.

(56) References Cited

U.S. PATENT DOCUMENTS 4,894,765 A 1/1990 Kahkipuro
6,410,993 B1 * 6/2002 Giers ...................... B60T 8/321
303/20

(Continued)

FOREIGN PATENT DOCUMENTS

CN 102303597 B 8/2013
CN 106458167 A 2/2017
(Continued)

OTHER PUBLICATIONS

Int'l Search Report and Written Opinion issued Sep. 20, 2018 in Int'l Application No. PCT/EP2018/067429, translation of ISR only.
(Continued)

*Primary Examiner* — Bradley T King
(74) *Attorney, Agent, or Firm* — Panitch Schwarze Belisario & Nadel LLP

(57) ABSTRACT

A device for a hydraulic actuating system, e.g., a motor vehicle brake, a clutch or a gear selector, may include the following components arranged in one housing, forming a main module: at least one pressure supply device driven by an electric motor drive, and a valve arrangement comprising at least one solenoid valve. The device may further include an electrical control unit (ECU) and valve output stages and sensors. The main module may be electrically and/or hydraulically connected to at least one further system component, which system component may include and actuating device and a travel simulator.

13 Claims, 13 Drawing Sheets

Figure 1A:
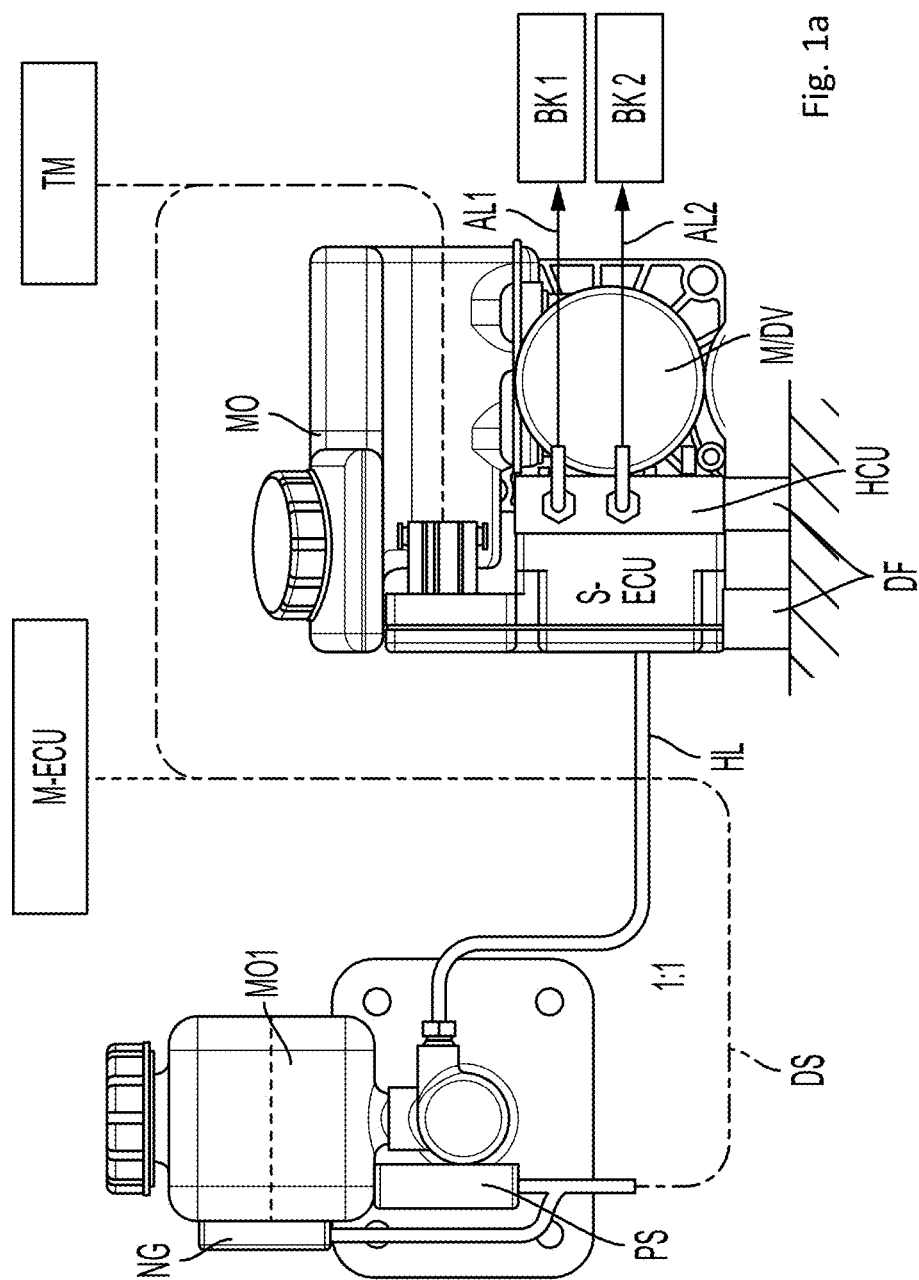

(51) Int. Cl.
  *B60T 8/40* (2006.01)
  *B60T 8/48* (2006.01)
  *B60T 13/66* (2006.01)

(56) References Cited

U.S. PATENT DOCUMENTS

| | | | |
|---|---|---|---|
| 7,859,212 | B2 | 12/2010 | Pan et al. |
| 8,930,114 | B1 | 1/2015 | Reid |
| 9,428,159 | B2 * | 8/2016 | Heise ............... B60T 13/746 |
| 10,468,966 | B1 | 11/2019 | Mourrier et al. |
| 11,447,111 | B2 * | 9/2022 | Rebholz-Goldmann ............... B60T 8/885 |
| 11,535,221 | B2 | 12/2022 | Jung |
| 2003/0227280 | A1 | 12/2003 | Vinciarelli |
| 2007/0267915 | A1 | 11/2007 | Shimada et al. |
| 2009/0045672 | A1 | 2/2009 | Nishino et al. |
| 2010/0065386 | A1 | 3/2010 | Bourqui |
| 2010/0084915 | A1 | 4/2010 | Crombez et al. |
| 2010/0089709 | A1 | 4/2010 | Shimada et al. |
| 2011/0031804 | A1 | 2/2011 | Shimada et al. |
| 2011/0156629 | A1 | 6/2011 | Satou et al. |
| 2012/0074767 | A1 | 3/2012 | Nishio et al. |
| 2012/0130581 | A1 | 5/2012 | Semsey et al. |
| 2012/0151914 | A1 | 6/2012 | Nishioka et al. |
| 2012/0160043 | A1 | 6/2012 | Drumm |
| 2012/0161505 | A1 | 6/2012 | Koyama |
| 2013/0213025 | A1 | 8/2013 | Linden |
| 2013/0218435 | A1 | 8/2013 | Nakamura |
| 2013/0234500 | A1 | 9/2013 | Morishita |
| 2013/0271056 | A1 | 10/2013 | Bunte et al. |
| 2013/0282249 | A1 * | 10/2013 | Heise ............... B60T 13/746 701/70 |
| 2013/0299271 | A1 | 11/2013 | Endo et al. |
| 2013/0333376 | A1 | 12/2013 | Murayama et al. |
| 2014/0015316 | A1 | 1/2014 | Schoenknecht |
| 2014/0020378 | A1 | 1/2014 | Hotani et al. |
| 2014/0028084 | A1 | 1/2014 | Biller et al. |
| 2014/0191624 | A1 | 7/2014 | Jahshan |
| 2015/0028666 | A1 | 1/2015 | Linhoff |
| 2015/0061366 | A1 | 3/2015 | Shimada et al. |
| 2015/0321652 | A1 | 11/2015 | Maruyama et al. |
| 2016/0009267 | A1 | 1/2016 | Lesinski, Jr. |
| 2016/0023644 | A1 | 1/2016 | Feigel et al. |
| 2016/0200307 | A1 | 7/2016 | Feigel |
| 2016/0264113 | A1 | 9/2016 | Feigel |
| 2016/0325719 | A1 | 11/2016 | Linhoff et al. |
| 2017/0072920 | A1 | 3/2017 | Besier et al. |
| 2017/0282877 | A1 | 10/2017 | Besier et al. |
| 2018/0017302 | A1 | 1/2018 | Werker et al. |
| 2018/0065609 | A1 | 3/2018 | Leiber et al. |
| 2018/0162334 | A1 | 6/2018 | Masuda |
| 2018/0339690 | A1 | 11/2018 | Kim et al. |
| 2019/0031165 | A1 | 1/2019 | Besier et al. |
| 2019/0039583 | A1 | 2/2019 | Besier et al. |
| 2019/0199086 | A1 | 6/2019 | Li et al. |
| 2019/0308601 | A1 | 10/2019 | Maj et al. |
| 2019/0344769 | A1 | 11/2019 | Zimmermann et al. |
| 2019/0363664 | A1 | 11/2019 | Nakamura |
| 2020/0114894 | A1 | 4/2020 | Leiber |
| 2020/0262399 | A1 | 8/2020 | Yokoyama et al. |
| 2021/0188233 | A1 | 6/2021 | Yuyama |
| 2021/0237706 | A1 | 8/2021 | Kim et al. |
| 2022/0041150 | A1 | 2/2022 | Leiber |
| 2022/0055592 | A1 | 2/2022 | Leiber |

FOREIGN PATENT DOCUMENTS

| | | | |
|---|---|---|---|
| DE | 19509150 | A1 | 9/1996 |
| DE | 10065347 | A1 | 7/2001 |
| DE | 10330146 | A1 | 1/2005 |
| DE | 102004030464 | A1 | 1/2006 |
| DE | 102007049620 | A1 | 10/2008 |
| DE | 102011017436 | A1 | 10/2012 |
| DE | 102012205860 | A1 | 10/2012 |
| DE | 102012213216 | A1 | 2/2013 |
| DE | 102013224313 | A1 | 9/2014 |
| DE | 112012004928 | T5 | 9/2014 |
| DE | 102013213888 | B3 | 11/2014 |
| DE | 102013222859 | A1 | 5/2015 |
| DE | 102013224776 | A1 | 6/2015 |
| DE | 102013224783 | A1 | 6/2015 |
| DE | 102014109628 | A1 | 1/2016 |
| DE | 102014221036 | A1 | 4/2016 |
| DE | 102014117727 | A1 | 6/2016 |
| DE | 102015104246 | A1 | 9/2016 |
| EP | 1874602 | B1 | 12/2012 |
| JP | 2005198479 | A | 7/2005 |
| JP | 2012066692 | A | 4/2012 |
| JP | 2013227011 | A | 11/2013 |
| JP | 2016144952 | A | 8/2016 |
| WO | 9505299 | A1 | 2/1995 |
| WO | 2006000407 | A1 | 1/2006 |
| WO | 2006111393 | A1 | 10/2006 |
| WO | 2006125732 | A1 | 11/2006 |
| WO | 2015016302 | A1 | 2/2015 |
| WO | 2015032637 | A1 | 3/2015 |
| WO | 2015074936 | A1 | 5/2015 |
| WO | 2016023994 | A1 | 2/2016 |
| WO | 2016110353 | A1 | 7/2016 |
| WO | 2016146223 | A2 | 9/2016 |
| WO | 2016146224 | A1 | 9/2016 |
| WO | 2016158485 | A1 | 10/2016 |
| WO | 2017205629 | A1 | 11/2017 |
| WO | 2018054863 | A1 | 3/2018 |
| WO | 2018130483 | A1 | 7/2018 |

OTHER PUBLICATIONS

Office Action issued May 27, 2021 in Chinese Application No. 201880043617.8.
Office Action issued Jan. 31, 2022 in United Kingdom Application No. GB2001150.8.
Notice of Allowance issued Feb. 14, 2023 in U.S. Appl. No. 16/626,909.
Intention to Grant dated Feb. 8, 2023 in GB Applciation No. 2211046.4.
Examination Report dated Jan. 11, 2023 in GB Application No. 2211046.4.
Search Report issued Aug. 17, 2022 in GB Application No. 2211046.4.
Examination Report dated Dec. 21, 2022 in GB Application No. 2214804.3.
Search Report dated Dec. 5, 2022 in GB Application No. 2214804.3.
Intention to Grant dated Mar. 15, 2023 in GB Application No. 2214804.3.
Examination Report dated Jan. 6, 2023 in GB Applciation No. 2214790.4.
Search Report dated Mar. 10, 2023 in GB Application No. 2214790.4.
Notice of Intention to Grrant dated Mar. 14, 2023 in GB Application No. 2214790.4.
Notice of Intention to Grant dated Mar. 14, 2023 in GB Application No. 2214812.6.
Examination and Search Report dated Dec. 6, 2022 in GB Application No. 2214812.6.
Office Action issued Sep. 14, 2023 in U.S. Appl. No. 18/201,012.
Office Action issued Sep. 14, 2023 in U.S. Appl. No. 18/201,362.
Office Action issued Jan. 8, 2024 in U.S. Appl. No. 18/201,012.
Office Action issued Jan. 30, 2024 in U.S. Appl. No. 18/201,362.
Notice of Allowance issued Dec. 11, 2023 in U.S. Appl. No. 18/198,602.
Office Action issued Oct. 11, 2023 in JP Application No. 2023-133396 with English Translation.
Office Action issued Oct. 11, 2023 in JP Application No. 2023-133401 with English Translation.
Office Action issued Jun. 24, 2024 in DE Application No. 11 2018 008 294.6 with English translation.
Office Action issued Jun. 24, 2024 in DE Application No. 11 2018 008 295.4 with English Translation.

(56) References Cited

OTHER PUBLICATIONS

Office Action issued May 28, 2024 in DE Application No. 112018003363.5 with English Translation.
Office Action issued May 31, 2024 in DE Application No. 11 2018 008 291.1 with English Translation.

* cited by examiner

DEVICE FOR A HYDRAULIC ACTUATING SYSTEM

CROSS-REFERENCE TO RELATED APPLICATIONS

This application is a continuation of U.S. application Ser. No. 16/626,909, filed Dec. 27, 2019, which is a Section 371 U.S. National Stage Filing of International Application No. PCT/EP2018/067429, filed Jun. 28, 2018, which was published in the German language on Jan. 3, 2019, under International Publication No. WO 2019/002475 A1, which claims priority to German Patent Application No. 10 2017 114 556.7, filed on Jun. 29, 2017, the disclosures of which are incorporated herein by reference.

DESIGNATION

The present invention relates to a device for a hydraulic actuating system, in particular of a motor vehicle brake or clutch.

PRIOR ART

In view of the many new systems from automobile manufacturers (OEMs), the installation of assemblies, in particular in the motor or assembly compartment, poses ever greater problems owing to the constricted installation spaces. In some cases, for example, the ABS assembly is, in particular in a front-wheel-drive and transverse motor configuration, situated behind the motor, which has the result that the motor must be dismounted during the exchange of the ABS assembly.

There is therefore the demand for OEMs to reduce the size of the existing assemblies or to make new assemblies for brake systems and clutches/gear actuators as compact as possible. Additionally, right-hand drive and left-hand drive vehicles exist, which, in the case of brake assemblies, has the consequence that the so-called packaging should be identical.

Many assemblies have electrical functions and sensors, which often require multiple plug connectors, which is in particular cumbersome from an installation aspect.

Furthermore, the demands with regard to crash safety are ever-increasing, which has the consequence that the installation length of the systems in the assembly compartment should be as short and narrow as possible, in particular if these are fastened to the bulkhead and adjacent assemblies or control units are attached to said installation unit. The ideal desire of automobile manufacturers (OEMs) is for no assemblies to be attached to the bulkhead with respect to the driver, which is possible only in the case of self-driving vehicles without a driver, because actuating devices (brake, accelerator pedal) can be omitted. Furthermore, use is increasingly made of automated transmission shift means (double clutches, automated manual shift means), such that clutch actuating devices can be omitted, and brake actuation and accelerator pedal remain as obligatory devices in vehicles with a driver.

As is known, there is a strong trend in the case of brake systems to move from the presently conventional so-called "3-boxed solutions", in which brake force booster, ABS/ESP assembly and vacuum pump form different structural units, which may in particular also be arranged spatially separately, to integrated "1-box solutions", in which all of the components such as pressure supply, hydraulic (valve) unit (HCU), feedback control unit (ECU) and master cylinder are integrated in one structural unit. DE 10 2012 213 216 describes for example a compact "1-box brake system" of said type. The main feature here is that the axis of the electric motor is perpendicular to the longitudinal axis of the first piston-cylinder unit.

In the mid-1980s, Teves produced, with Mark 2, a partially integrated solution with this feature, but also, as a variant, that the axis of the electric motor with pump was arranged parallel to the actuation axis. Notable, and distinct from the proposed invention, is an absence of integration of motor and pressure supply and ECU in one housing unit. Here, the motor with pump was mounted and connected by means of hose lines to the housing composed of valve block (HCU) and cylinder-piston unit. The aim of a very narrow and short structural unit has not yet been achieved.

As a sensor for the electric drive motor, DE 10 2011 017 436 describes a toothed gear drive of the motor target. The sensor element is in this case arranged in a sensor module which is connected by means of a plug connection to the system circuit board. Additionally, redundant pedal travel sensors and a sensor for monitoring the fill level in the brake fluid vessel are required.

In the case of a brake system described in DE 10 2012 213 216, a first cylinder-piston arrangement actuated by the vehicle driver, a pressure provision device and a valve arrangement are arranged in the same housing, wherein the axis of the electric motor of the pressure provision device is arranged substantially perpendicular to the longitudinal axis of the first cylinder-piston arrangement. With this solution, it is already sought to realize a certain degree of compactness, which can however still be further improved; in particular, DE 10 2012 213 216 is designed for the spatial boundary conditions of a circular contour of the conventional vacuum booster, and does not take into consideration the overall packaging optimization in the vehicle. For optimum packaging, a rectangular structural form is more opportune than a circular contour. Also, in particular, the adaptability to different installation situations leaves something to be desired, such as for example the installation in the motor compartment (so-called "front bolted"), in particular for electrical brake force boosters and electrical brake force boosters with integrated ABS, which are mounted on the bulkhead.

There is an ever increasing trend toward electrical vehicles or hybrid vehicles with increasingly silent traction operation. Therefore, an integrated 1-box brake system arranged on the bulkhead, which generates noises owing to electric motor, gearing, hydraulics and valve switching, is also increasingly conspicuous, because the drive motor (in particular in the case of electric vehicles and hybrid vehicles) is increasingly no longer audible. There is therefore also a demand for a solution for brake systems for electric vehicles in order that these operate as silently as possible and to position the noise-generating components differently and as far as possible minimize a transmission of body-borne sound.

Several manufacturers such as for example Apple, UBER or Google are working on entirely autonomous driving vehicles without a driver, which vehicles, in the final configuration level, are intended to no longer have a brake pedal. The EMB or wedge-type brake exists as a known approach to a solution to this. These systems have not become established in the past owing to safety concerns and high costs. The high costs are in particular based on the fact that an electric motor and a complex electromechanical mechanism is required for each wheel brake.

The demands for novel future brake systems, in particular with increasingly more powerful electric drive motors, can be summarized as follows:

- short and narrow structural form
- good accessibility for installation of the hydraulic lines, in particular of the brake lines to the wheel brakes
- good accessibility for plug connectors, in particular of the main line set, and short cable length to the motor vehicle distributor box (central electrical system)
- good ventilation capability not only in the final assembly process (with vacuum) but also during servicing (ventilation by pedal actuation)
- short line paths of the power lines from the plug connector to the power part of the motor controller
- good cooling and heat dissipation of the power part (output stages, MOSFET and driver)
- noise reduction from drive and solenoid valves, body-borne noise transmission to the bulkhead
- short bores from the THZ, pressure delay to the HCU;

Specifically for purely electric vehicles (electric vehicles) and future vehicles with autonomous driving operation or driving operation without a driver, the following further demands apply:

- absolutely silent operation, that is to say no disturbing noises from assemblies on the bulkhead,
- even shorter structure than in the case of conventional passenger motor vehicles owing to new vehicle platform concepts,
- wheel-specific or axle-specific brake intervention in particular by drive motors during generator operation, wherein traction motors are positioned at one or 2 axles or directly at the wheels,
- increased safety through redundancy of the systems, signal transmission and electrical supply
- new demands on the feedback control accuracy for the purposes of further shortening of braking distances.

Owing to the multiplicity of vehicle drive concepts, in particular with a coexistence of vehicles with internal combustion motors and purely electric vehicles (internal combustion motors, hybrid motors, purely electric vehicles, driverless vehicles), the modularity of the systems, that is to say the use of identical parts/modules, in particular in the pressure supply, is of enormous importance.

OBJECT OF THE INVENTION

It is the object of the present invention to provide a device in the case of which the main components for a hydraulic actuating system for vehicles are designed with consideration of demands for an extremely short structural length on the bulkhead, silent operation, very high reliability/system availability and high feedback control accuracy demands, in particular for electric vehicles, hybrid vehicles with electric traction motors (TM) and vehicles with autonomous driving operation or driverless vehicles.

Achievement of the Object

The object of the invention may be achieved by means of a device having features as set forth in various ones of the attached claims.

The device according to the invention is in particular advantageously distinguished by the fact that the main components such as the pressure supply device in the form of a piston-type or double-stroke piston-type pump with one or two working chambers for the pressure change in at least one hydraulic circuit, and also the electromotive drive thereof and an interposed transmission mechanism, in particular a recirculating-ball mechanism or trapezoidal spindle mechanism, and also a valve arrangement with at least one solenoid valve, hydraulic ports for at least two hydraulic consumers of the hydraulic actuating system, and also an electrical control unit ECU for activating the solenoid valves and the electromotive drive, are combined in one module (hereinafter referred to as main module), and that the main module is either electrically connected to at least one further system component or is both electrically and hydraulically connected to at least one further system component (hereinafter referred to as actuating module or system component), wherein the further system component may be an electrically or hydraulically operating travel simulator with actuating pedal and/or a central processor.

The device according to the invention can thus advantageously be used for the pure pressure supply, pressure feedback control and assembly diagnostics, wherein

- either no brake pedal whatsoever is used, as is the case in an autonomously driving vehicle,
- or a brake pedal or brake lever is used which is coupled purely electrically to the module, as may be the case for example in a brake-by-wire electric vehicle,
- or a brake pedal or brake lever is used which is hydraulically and electrically coupled to the module, wherein, in the latter two variants, a travel simulator may also be provided in each case.

If a hydraulic connection exists between the main module and the actuating module with, for example, the brake pedal, then a hydraulic fall-back level is realized, whereby, for example in the event of a failure of the motor of the main module, a brake pressure can still be built up in at least one wheel brake by means of the brake pedal. Depending on the design variant, vehicle type (two-wheeled vehicle, passenger motor vehicle, passenger motor vehicle with electric drive motor) and safety demands, the actuating module may be designed as a single-circuit or two-circuit master brake cylinder (HZ or THZ) and, in the event of a system failure (full-back level), hydraulic volume can be conducted into one or two brake circuits, or two or four wheel brakes, in order to generate a manual emergency braking function.

Additionally, the main module may also be connected via advantageously redundant data lines, in particular a data and/or control bus, to a superordinate control device.

The brake pedal as actuating device may likewise be arranged in an additional module, wherein a travel sensor may optionally also be arranged in the additional module. The additional module is then, depending on the design of the actuating device, connected to the main module either by means of a purely electrical or by means of an electrical/hydraulic connection.

The main module according to the invention may be provided singly or multiply in a vehicle. Accordingly, a main module may perform pressure feedback control selectively in two wheel brakes, preferably of one axle, or four wheel brakes of the vehicle.

In a first embodiment, provision is made whereby a main module has two hydraulic output lines, by which the pressure feedback control, for example brake force boosting and blending feedback control during recuperation, is performed in two separate wheel brakes or two hydraulic circuits.

The embodiment 1 is provided for a two-wheeled vehicle or a vehicle in which brake force boosting or blending is used on one axle, for example in motor racing with a high-power electric drive motor. Blending is required if, at one axle, an electric drive motor is provided with which recuperation is performed in the generator mode. The recuperation is in this case feedback-controlled by the main module, wherein a constant driver feel in the actuating unit is set by adjustment, that is to say the actuating unit is not influenced by the pressure feedback control and is decoupled. The actuating unit is in this case decoupled in the normal mode by means of a normally open solenoid valve, which is preferably arranged in the main module. If solenoid valves are required in the actuating module for other functions (diagnostics, travel simulator) (as stated for example in PCT/EP2015/068693 from the applicant), it may also make sense for a normally open solenoid valves to be arranged in the actuating unit. This is opened only in the event of a failure of the main module, and brake pressure can be built up in the wheel brakes by means of the hydraulic power built up by means of the actuating unit.

The ABS/ESP functions are in this case possible without restriction in the case of use in the 2-wheeled vehicle. In the case of use of embodiment 1 in a vehicle with 2 axles, driving stability functions can be realized only in restricted form by means of the pressure feedback control, such as for example ideal distribution of the brake pressure in the axles in a manner dependent on the weight shift during deceleration and acceleration. The latter function is entirely adequate for simple vehicles, such as for example urban city vehicles, inexpensive vehicles in emerging countries of <1 tonne vehicle weight.

In a further possible second and third embodiment, in order to achieve greater dynamics or redundancy, two main modules are arranged in the vehicle, which main modules each have a pressure supply unit, solenoid valves and a control unit, wherein the system has two hydraulic circuits with 4 hydraulic consumers, for example four wheel brakes, and each main module is used for the pressure feedback control of only one hydraulic circuit with multiple consumers, such as for example two wheel brakes.

With this system, it is possible with two main modules to perform ideal feedback control of the wheel brakes, such as for example brake force boosting, blending, ABS/ESP and driver assistance functions (for example emergency braking function, distance control, etc.). Here, the system is similar to the performance characteristic of purely brake-by-wire systems (EMB, wedge-type brake). In particular, in this design variant, it may be expedient to use multiplex feedback control, as stated in the patent EP 1 874602 from the applicant. For this purpose, in each case one solenoid switching valve must be provided for each brake circuit in the main modules. For at least one main module, aside from the switching valves, an outlet valve may also be provided, as stated in PCT/EP2015/081402 from the applicant. In this way, it is possible in particular to satisfy the highly dynamic feedback control demands for the front axle of the vehicle. It may also be advantageous for the valve switching and control as stated in PCT/EP2015/081403 to be used in order to realize a quiet pressure build-up with admission pressure control by means of the piston and to discharge pressure via outlet valves.

Additionally, the system has very high redundancy similar to customary 2-box systems (electric booster+ESP), because it has two entirely separate main modules with respectively dedicated electronics and electric motor, which, in the event of failure of one module, can still serve 2 wheel brakes. Adequate safety for autonomous driving is thus realized.

The embodiment 2 also has a hydraulic connection of the actuating unit to a main module. For this purpose, a normally open solenoid valve is provided in a main module. Thus, in the event of failure of a system, pressure is still built up in a brake circuit by means of the actuating force of the driver, and the safety of the system is additionally increased by means of 2 main modules aside from the redundancy already provided.

With the third embodiment, the control is realized purely electrically by means of an M-ECU, and the main module preferably performs only additional pressure actuation functions. The driving dynamics feedback control is then performed in a M-ECU, which is preferably likewise of redundant design (for example quad core). In this embodiment, the actuating unit can be omitted. In this embodiment, it is advantageously possible for the electrical connection between the main modules, on the one hand, and between the main module and the control unit, on the other hand, to be of redundant design, and the main modules are connected redundantly to two voltage sources, such as for example 12 V battery, second voltage supply network 48 V or high voltage, 12 V battery and DC/DC converter of a second voltage network. Furthermore, the signal transmission between main module and control unit is performed preferably redundantly with 2 signal lines, wherein the line may be a cable or radio transmission. The combination of transmission by cable and radio transmission is thus also a possibility for the redundancy. With these expanded redundancy measures, the third embodiment is adequately equipped with redundancies and safety functions even for autonomous driving or vehicles without a driver, and, in terms of cost and reliability, is superior to a purely electrical brake system with four actuators for in each case one wheel brake (wedge-type brake, EMB).

For the third embodiment, the use in particular of a trapezoidal spindle, as discussed in more detail in the main module construction concept 2, is a further possibility for reducing costs. This is possible because lower levels of power are required, and the system, owing to an absence of structural space constrictions, has degrees of freedom with regard to the design of the piston of the pressure supply of the main module. Thus, the system can be designed for low axial force loads of the trapezoidal spindle and low torques of the drive motor, and can be of very inexpensive design, such that the additional costs of 2 modules are relatively low.

Figure 7:
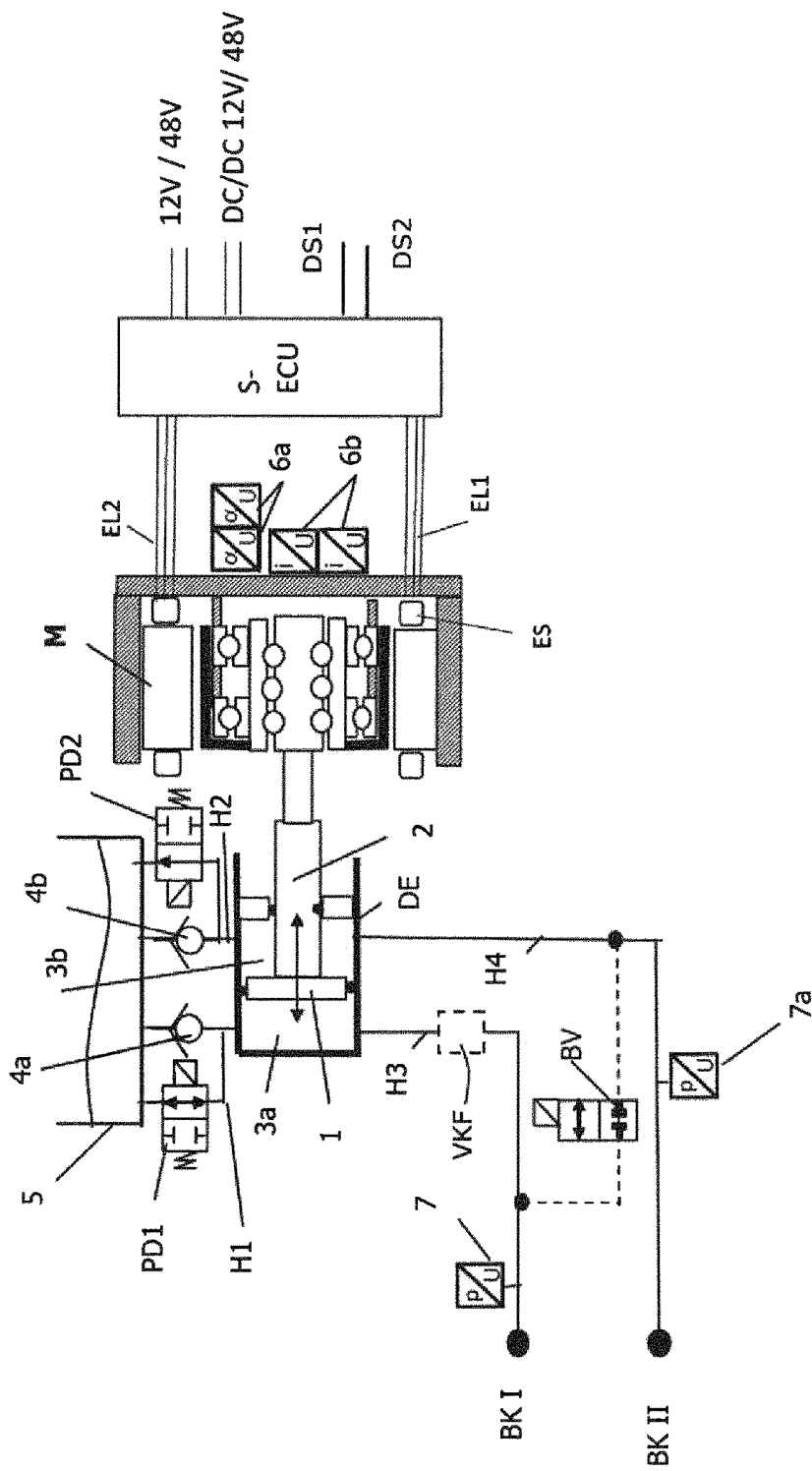

In the further variants (embodiments 4 to 7), only one main module is provided. The main module has four hydraulic output lines, wherein the pressure feedback control in one of four wheel brakes is performed via each output line. In the case of such a system, the main module can perform all functions, such as for example brake force boosting, blending, ABS/ESP and driver assistance functions, and has cost advantages in relation to the second and third embodiments with simultaneously only few restrictions in terms of performance, and is therefore provided as a target system concept for series applications in passenger motor vehicles. As a pressure supply, use is advantageously made here of a double-stroke piston-type pump with 2 working chambers, in order to generate hydraulic redundancy. The configuration of the pressure supply with electric motor, spindle drive and piston is set out in more detail in FIG. 3. Furthermore, 2×3 phase contacting of the drive motor and a redundant electrical supply, as set out in FIG. 7, is advantageously expedient in order to increase availability. Aside from the redundancy of the 2×3 phase contacting, a galvanically separate design of the electronic circuit board, in particular of the B6 bridge of the motor, is also advantageous. This also applies to the further embodiments, where 2×3 phase contacting is used.

In the fourth to sixth embodiments, in addition to the main module, an actuating module is provided, wherein this has a preferably redundant electrical connection and one or two hydraulic connections to the main module in the fourth embodiment, but has only a purely electrical, preferably redundant connection in the fifth and sixth embodiments. In the fourth embodiment, one or two normally open valve(s) is or are provided which is or are preferably integrated in the main module. One normally open valve is required for an actuating module with one circuit, and two normally open valves are required in the case of an actuating module with two hydraulic circuits (for example PCT/EP2015/068693). By means of the hydraulic connection, a fall-back level in the event of a failure of the main module is provided in that, in the event of a failure of the main module, the actuating module supplies pressure medium to at least one brake circuit, preferably two brake circuits, or builds up a pressure in the at least one brake circuit. To increase the redundancy, it is also possible to provide two hydraulic lines rather than one between the main module and actuating module.

In the case of omission of the hydraulic connection or of the actuating module in the fifth embodiment, there is an imperative need for additional safety measures, which is also recommended in the fourth embodiment, for example a redundant connection of the main module to two on-board electrical systems, redundancy of the signal lines, design of the motor in the form of 2×3 phases, configuration of the system for hydraulic redundancy, for example by means of double-stroke piston-type pump with 2 working chambers.

In the sixth embodiment, two electric motors and 2 redundant pressure supplies are provided, wherein in each case one pressure supply supplies pressure to one hydraulic circuit or 2 wheel brakes. The pressure supply is in this case preferably designed as a single-piston pump with trapezoidal spindle (cf. FIG. 4 with trapezoidal spindle). It is possible here to omit a certain degree of redundancy (2×3 phase contacting of the electric motor) and double-stroke piston-type pump with 2 working chambers. The system can also achieve higher feedback control performance if each pressure supply of the main module can in parallel and independently of one another supply pressure medium to a hydraulic circuit. In this case, in embodiment 6, with performance similar to embodiment 2 and 3, that is to say in each case one motor serves one hydraulic circuit or 2 wheel brakes, it is thus also possible in a multiplex method (without outlet valves) for pressure to be built up in one brake circuit, while the pressure in the other brake circuit is dissipated, in parallel. This has advantages in particular in the case of highly dynamic interventions (for example braking on a high friction coefficient, special ESP interventions) and leads to driving stabilization in the case of very high-power vehicles and to shortening of braking distances. In order that similar reliability to the second and third embodiment is realized, the electronic system is of redundant configuration with separate drivers for each motor, for example 2×B6 bridge, galvanically separate electronic circuit boards, and the electrical supply and signal transmission of the main module are likewise of redundant configuration.

The seventh embodiment is intended for vehicles without a driver, whereby no actuating module is required, and this is therefore omitted.

As a result of the division of the device according to the invention into multiple modules, the main module can be arranged remote from the bulkhead in the motor compartment, whereby it is advantageously the case that less noise generated by the main module passes into the passenger compartment, which noise is generated by the highly dynamic feedback control in the ABS/ESP mode as a result of hydraulic vibrations and solenoid valve switching noises as a result of pressure differences. The main module can be arranged at virtually any location in the motor compartment.

If the vehicle has a traction motor, this can likewise be used for braking assistance. For this purpose, it is necessary for said traction motor to be correspondingly actuated and for the functions of the components to be coordinated with one another. Therefore, an electrical connection via a data and/or control bus between the main module, a superordinate controller and the traction motor is necessary and must be correspondingly provided.

The main module may be arranged both horizontally and vertically in the motor compartment. It is likewise possible for corresponding damping elements to be provided for the purposes of noise minimization.

The plug connector design of the main module is furthermore of advantageous design with regard to a minimal box volume and good accessibility. This may be realized in the form of the plug connector being directly connected to the electronic circuit board of the main module and standing at a 90° angle with respect to the electronic circuit board. Furthermore, the plug connector is, in possible refinements of the above-described embodiments, attached below the reservoir vessel, and can in particular be pulled off horizontally, parallel to the motor. In this way, no structural space, which is otherwise required for the installation of the plug connector, is wasted.

Furthermore, as discussed in more detail below, the main module may advantageously be designed such that all sensors and valve bodies of the solenoid valves are positioned directly on the ECU circuit board, the phase contacts of the electric motor lead directly to the electronic system, and the electronic system can be installed very easily. Here, the coil body of the solenoid valves is connected to the circuit board, the sensor evaluation elements are mounted with a spacing to the sensor target by being plugged in, and the 3 (6) phase contacts of the lead frame of the electric motor are either plugged onto the circuit board (for example Radsok contacts) or the phase contacts are welded to copper elements on the circuit board.

Furthermore, the main module may exhibit very simple mounting and radial force compensation by means of a flexural rod concept, wherein the flexural rod is connected to a rotating spindle preferably by means of a welded connection. The spindle is formed from a metallic, high-strength material, which preferably drives a trapezoidal spindle composed of plastic. The trapezoidal spindle is used in particular in systems with low maximum pressures and systems composed of multiple main modules. This is advantageous in particular in the case of the first, second, third and sixth embodiment, though may also be used in systems with at least one high-power drive motor which assists the braking and thus positively influences the volume balance or the maximum pressure requirements. The trapezoidal spindle may also be used in the case of systems with one motor, as is the case in the fourth, fifth and seventh embodiment, by virtue of special materials being used in the trapezoidal spindle and/or the main module being positioned where low ambient temperatures prevail with an active feed of air, for example in the front-end region of the vehicle. In particular in the case of electric vehicles, the temperature is significantly lower than in the case of vehicles with an internal combustion engine, and further promotes the use of the trapezoidal spindle.

As an alternative to the trapezoidal spindle, a ball screw drive (KGT) may be used. A ball screw drive has the advantages of relatively high efficiency and relatively high capacity for loading by axial forces, in particular in the case of large and heavy vehicles with a total weight of more than two tonnes. Furthermore, the ball screw drive facilitates the feedback control, because the system has less hysteresis. A combination of trapezoidal spindle in one module is also conceivable, for example KGT at front axle, trapezoidal spindle at rear axle.

The pressure unit of the main module may also be designed so as to have a very simple and inexpensive torque support and such that it can be easily converted with few modifications from a single-stroke to a double-stroke piston-type pump.

There are furthermore a wide variety of possible uses for the device according to the invention, and the modules can be easily combined for different system concepts, such that a very broad spectrum of vehicle classes can be covered with few components.

Figure 1B:
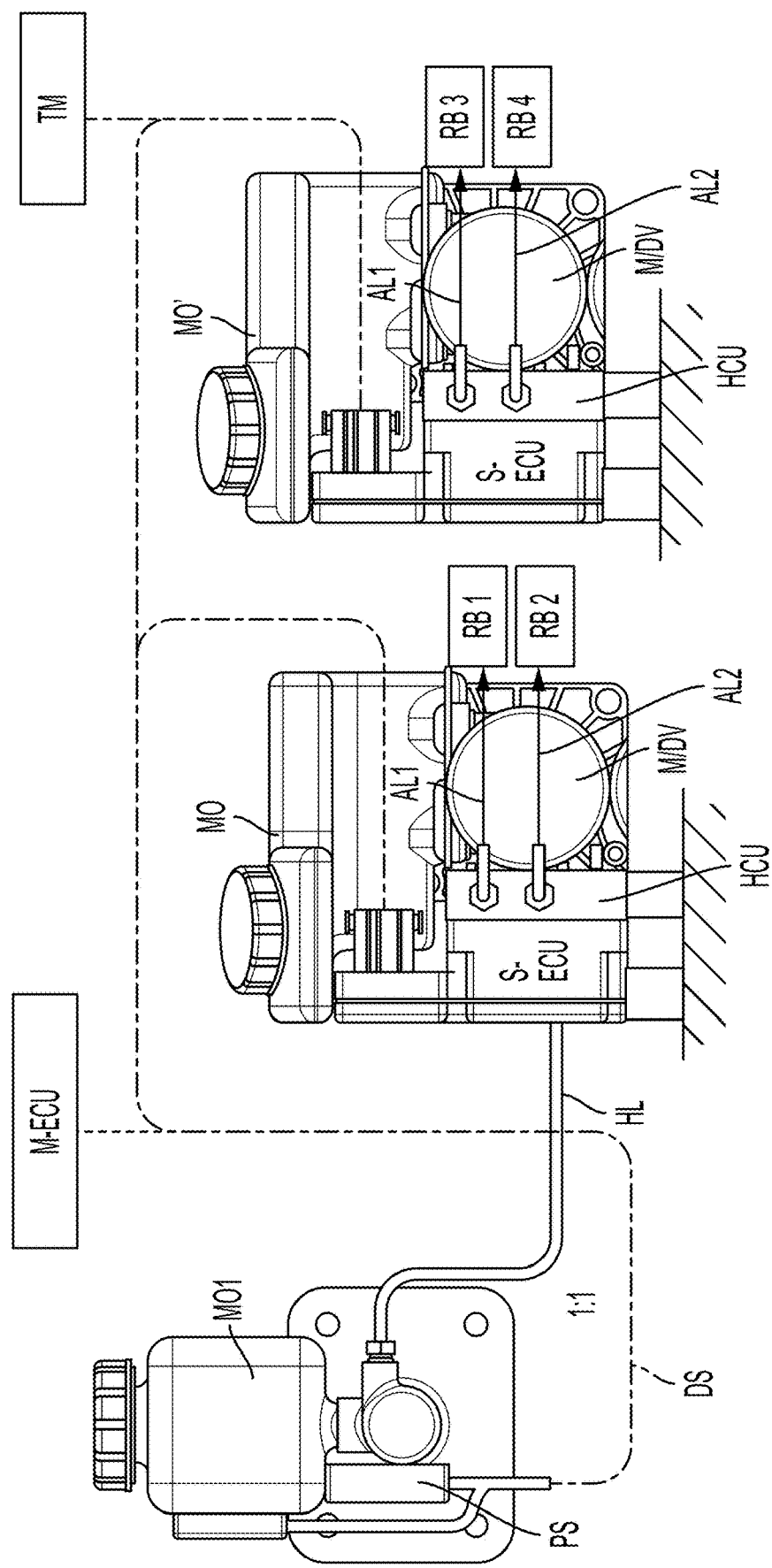
Figure 1C:
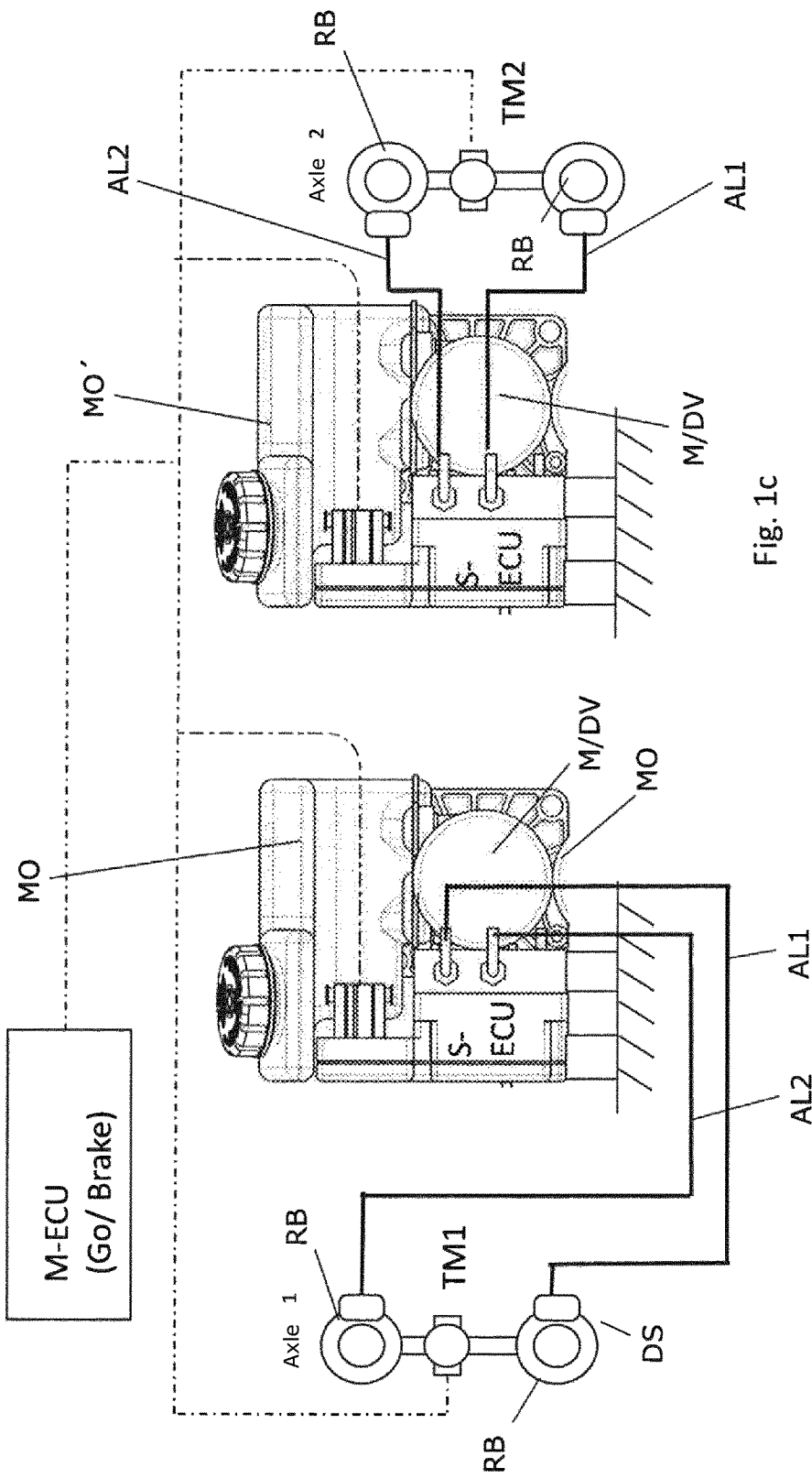
Figure 2A:
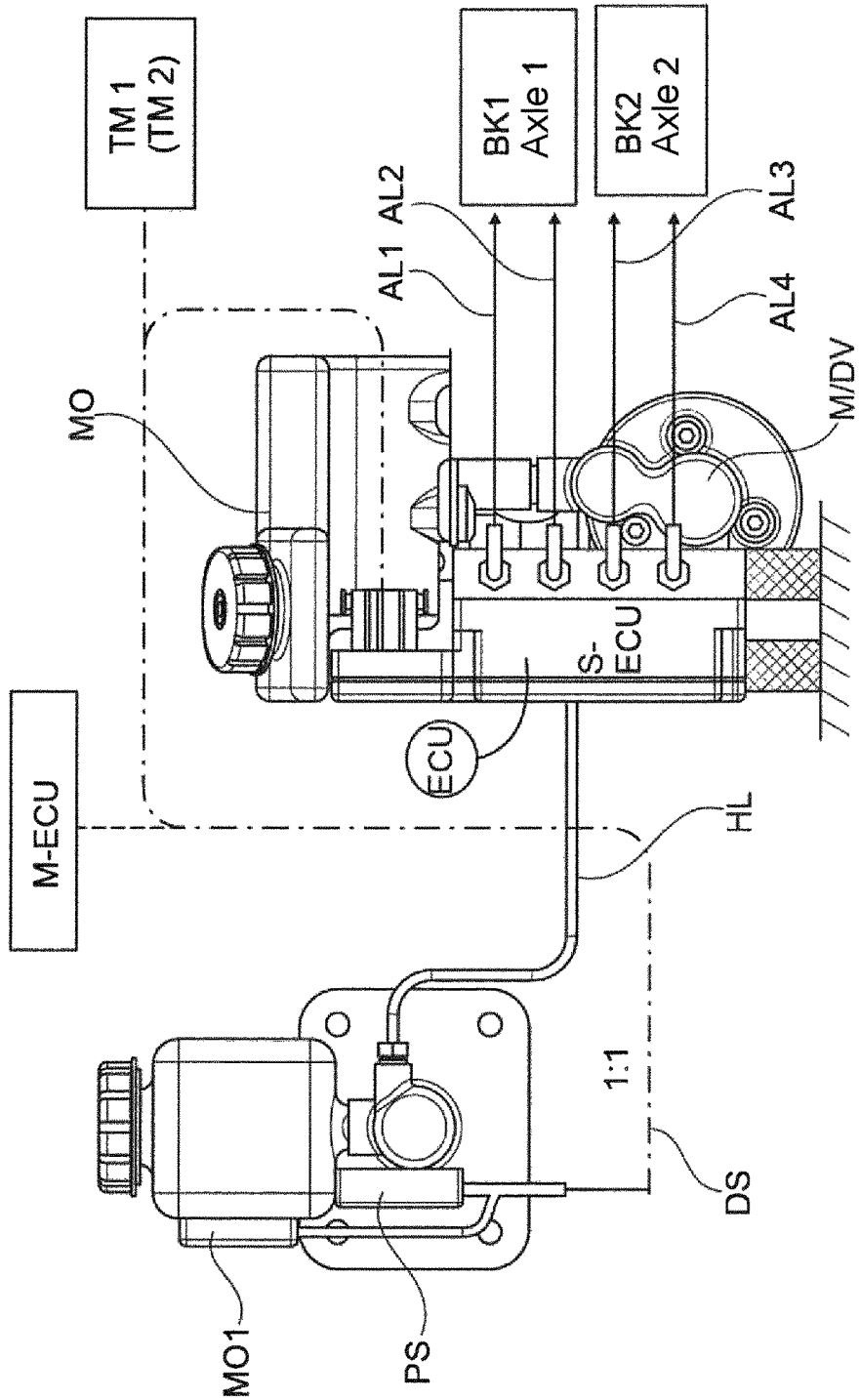
Figure 2B:
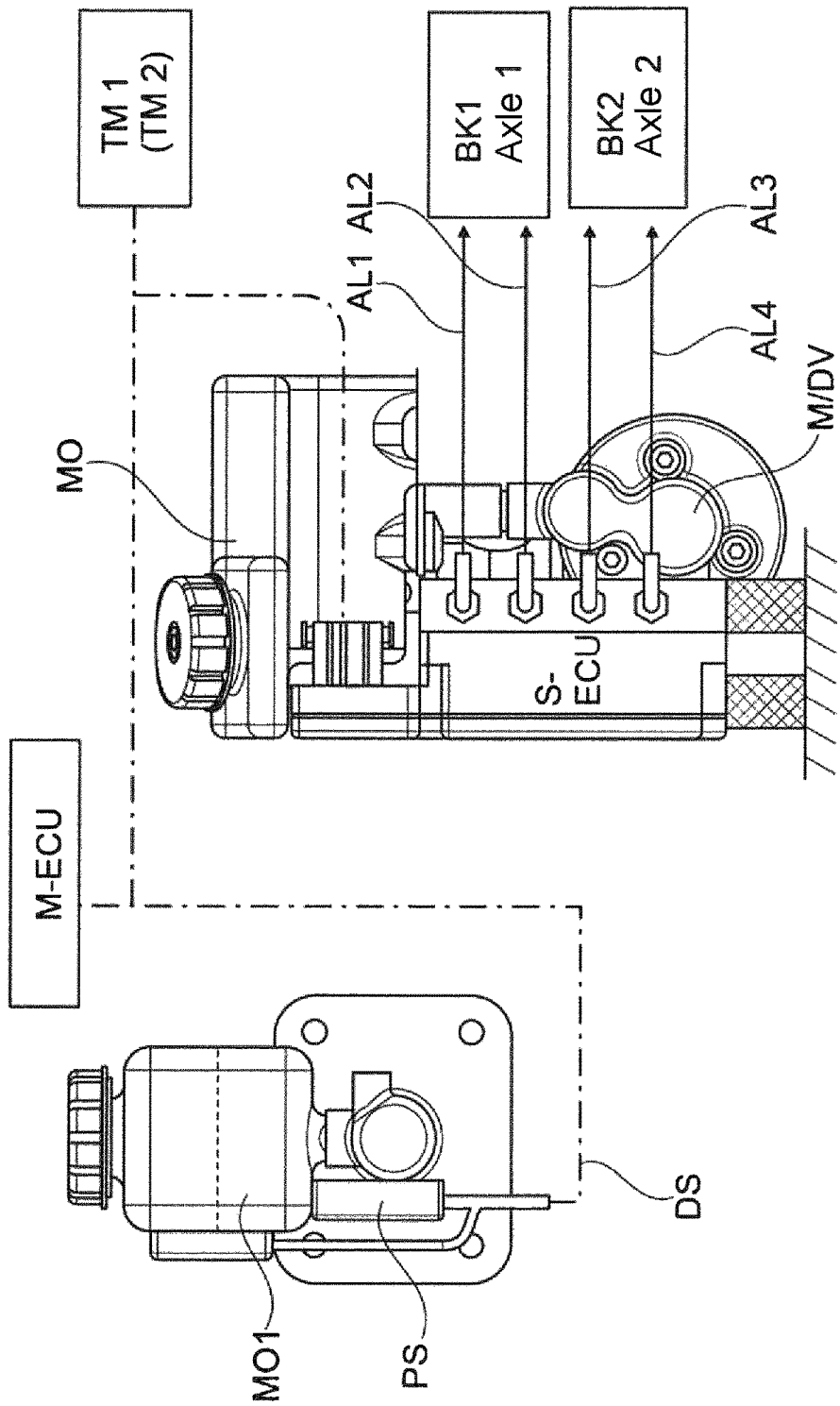
Figure 2C:
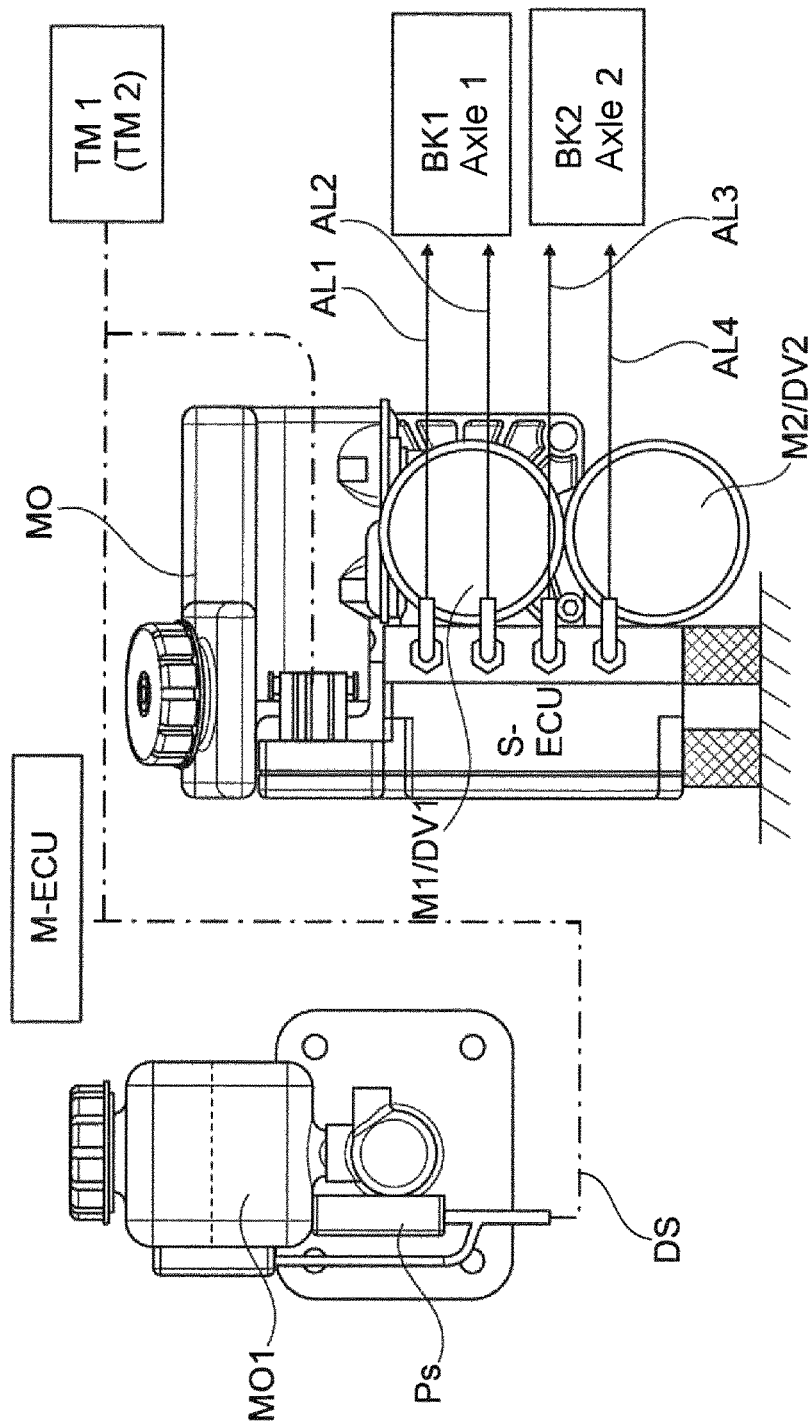
Figure 2D:
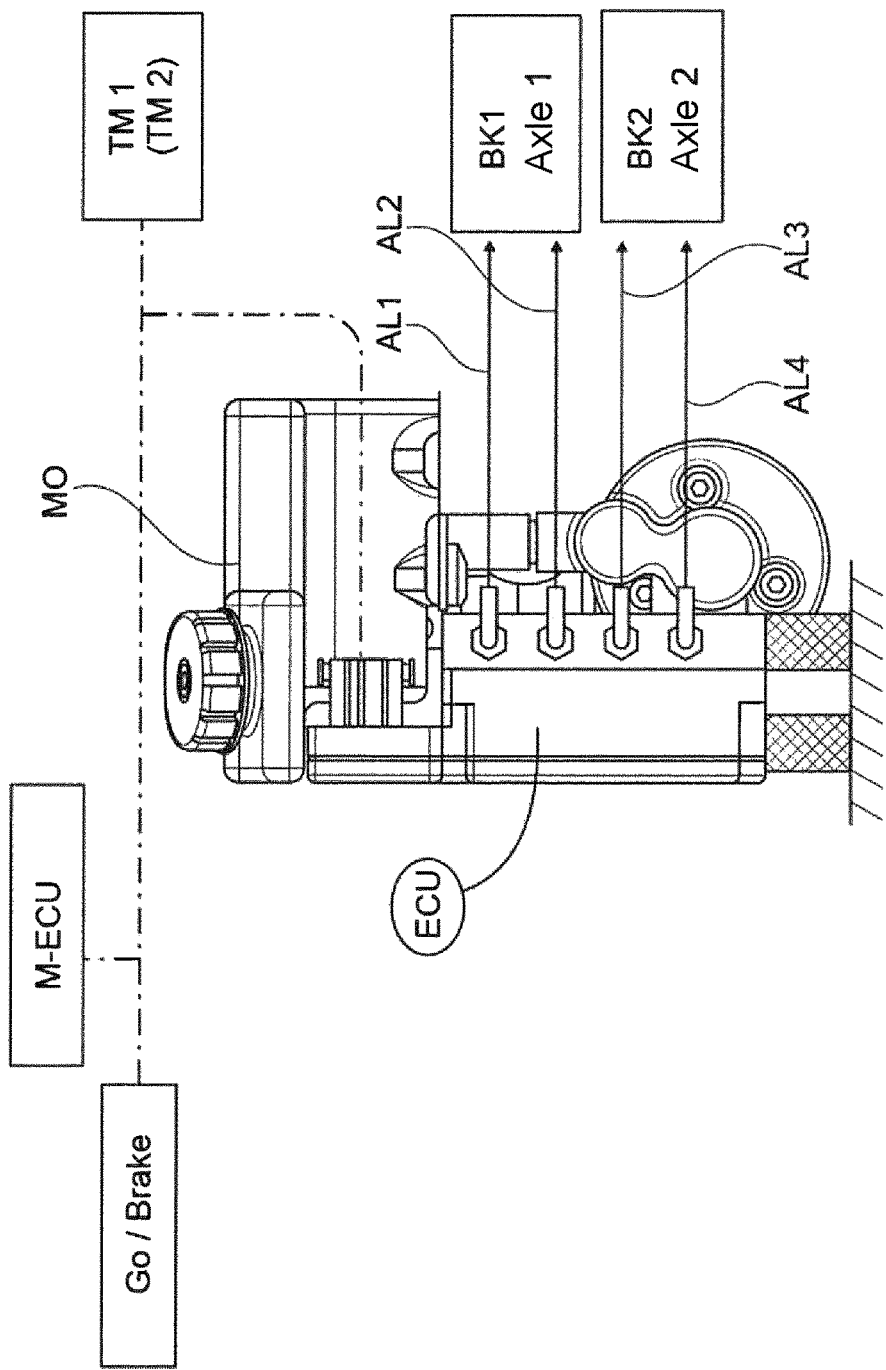
Figure 3:
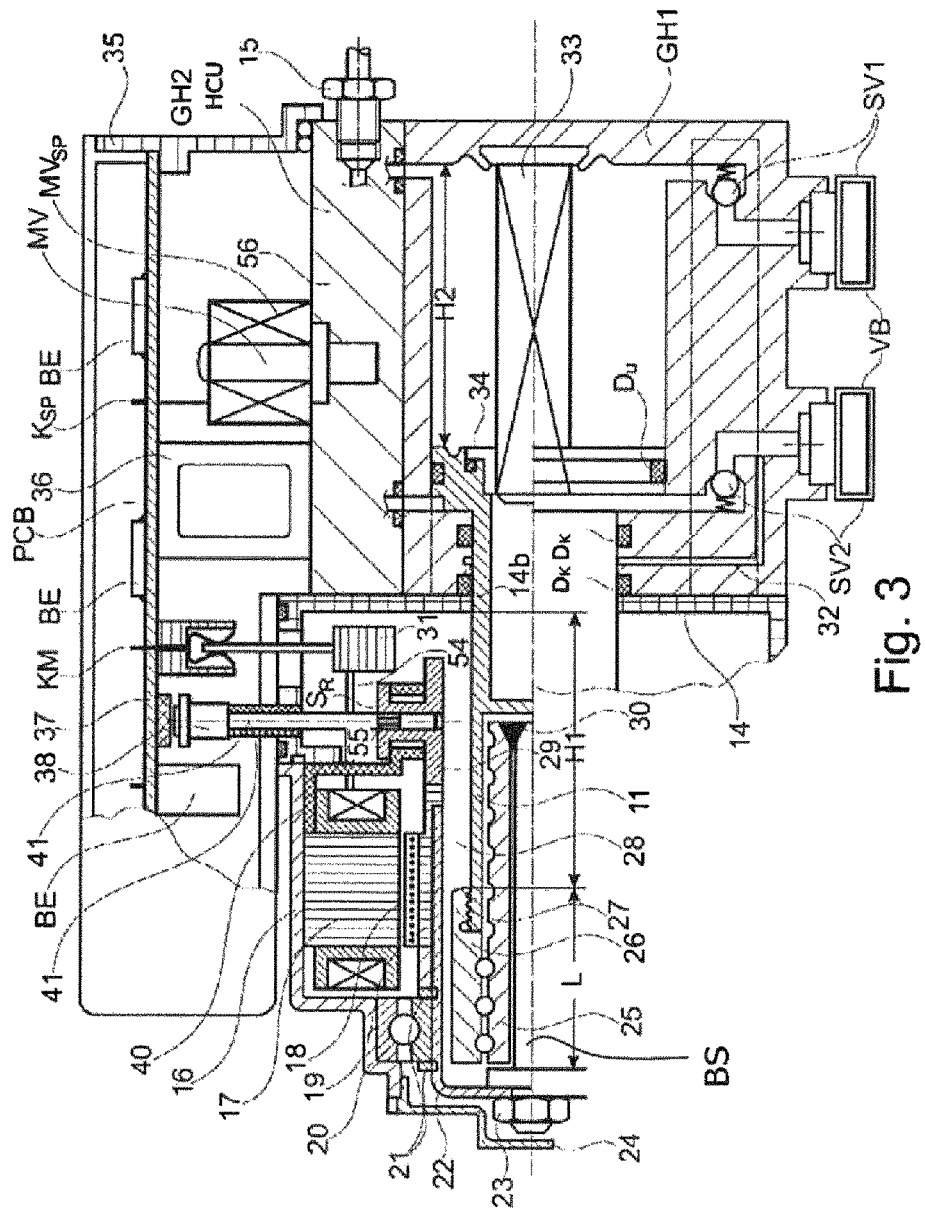
Figure 4:
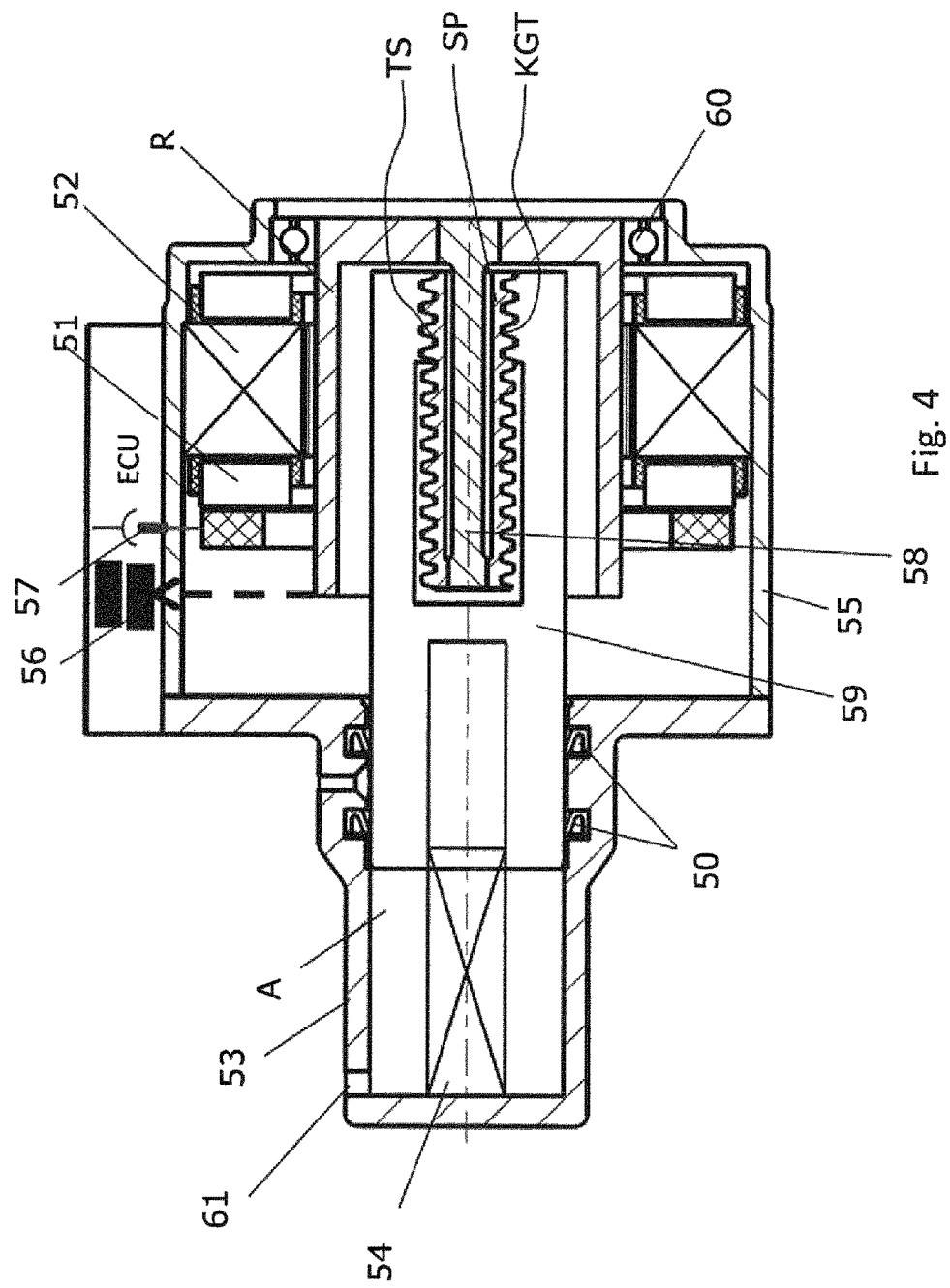

The device according to the invention, and the use thereof in a two-wheeled or four-wheeled vehicle, will be discussed in more detail below on the basis of drawings, in which:

FIG. 1a: shows a first embodiment according to the invention with an actuating system with two hydraulic consumers, in particular for two-wheeled vehicles or vehicles with axle-by-axle blending without ABS/ESP, wherein the main module and the additional module are connected to one another via an electrical data and/or control line and a hydraulic line;

FIG. 1b: shows a second possible embodiment with two main modules for very high feedback control demands and flexible positioning, and an additional module with actuating device;

FIG. 1c: shows a third possible embodiment without a pedal with two independent and redundant main modules for a brake-by-wire brake system or an autonomously driving vehicle without brake pedal;

FIG. 2a: shows a fourth embodiment for a passenger motor vehicle series system concept with hydraulic fall-back level with a main module for pressure feedback control in four wheel brakes and with an additional module with actuating device, wherein the main module and the additional module are connected to one another via an electrical data and/or control line and a hydraulic line;

FIG. 2b: shows a fifth embodiment for a passenger motor vehicle series system concept without hydraulic fall-back level corresponding to FIG. 2a, but without hydraulic connection between main module and additional module;

FIG. 2c: shows a sixth embodiment for a passenger motor vehicle series system concept without hydraulic fall-back level with two motors, wherein, in the main module, there are arranged two pressure supply devices with respectively separate electromotive drives and gearings;

FIG. 2d: shows a seventh embodiment for a brake-by-wire system without mechanical actuating module with a main module for a brake-by-wire brake system or an autonomously driving vehicle without brake pedal for the supply of pressure to four wheel brakes;

FIG. 3: is a cross-sectional illustration through a first possible embodiment of a main module with motor, sensor, electrical connection HCU and ECU with magnet coil, pressure piston with suction valves;

FIG. 4: is a cross-sectional illustration through a second possible embodiment of a main module, wherein a trapezoidal spindle is illustrated in the upper half of the drawing and a ball screw drive is illustrated in the lower half of the drawing.

Figure 5A:
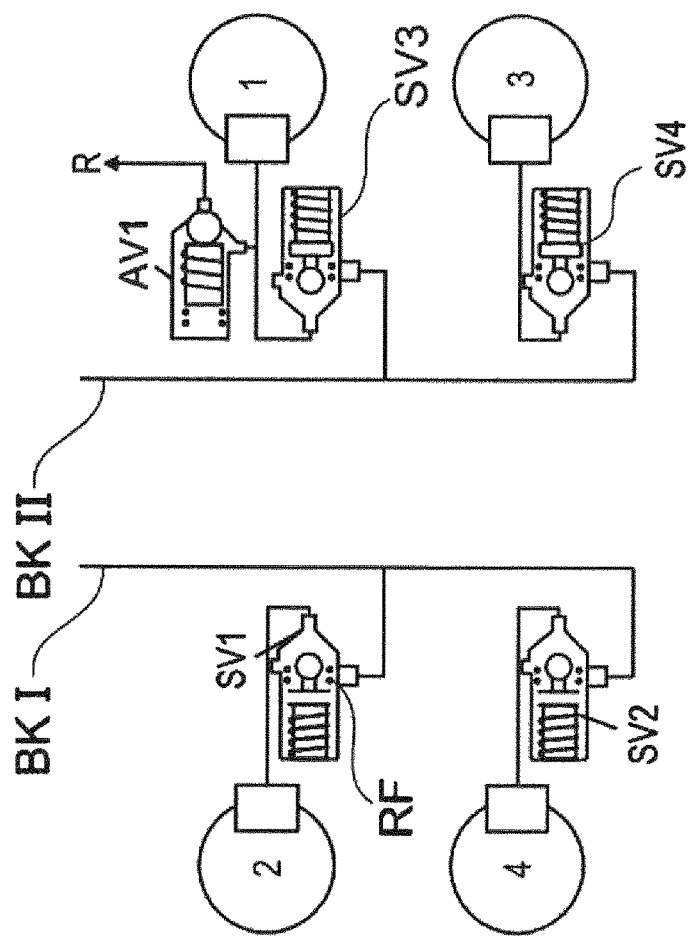
Figure 5B:
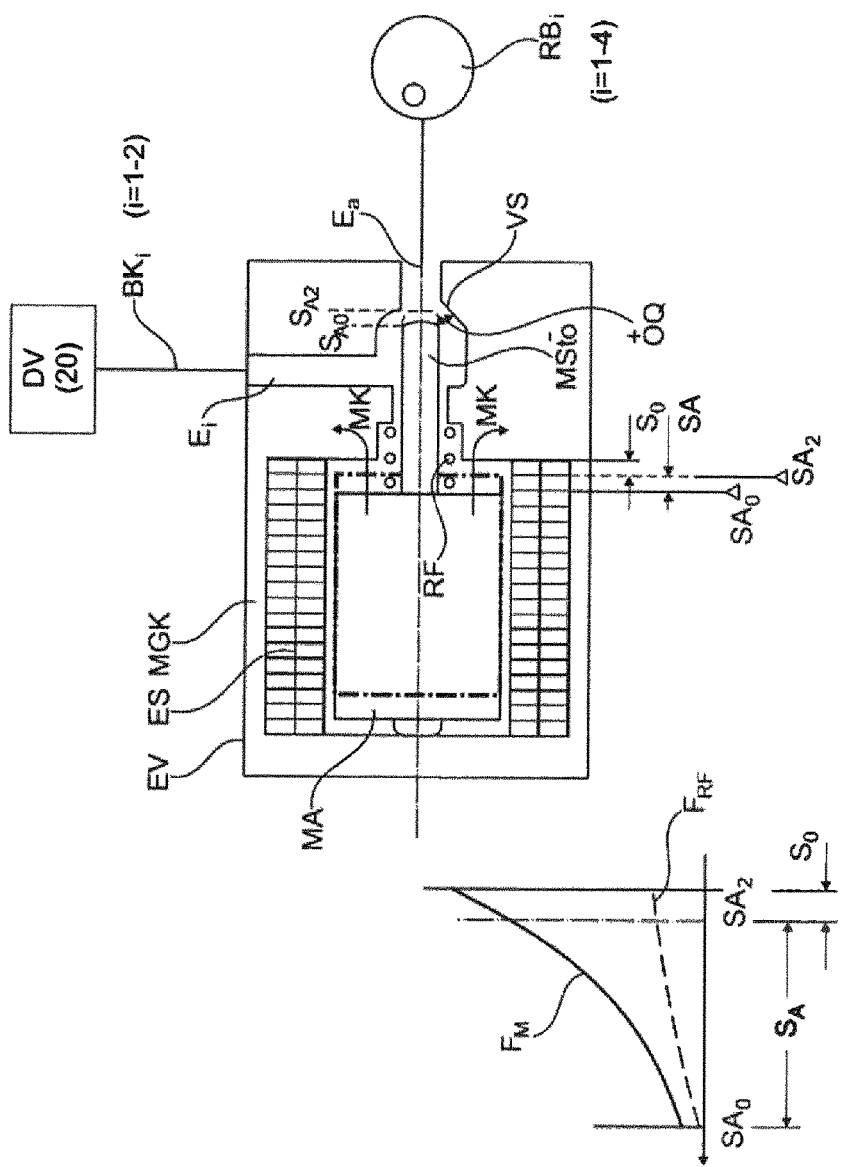
Figure 6:
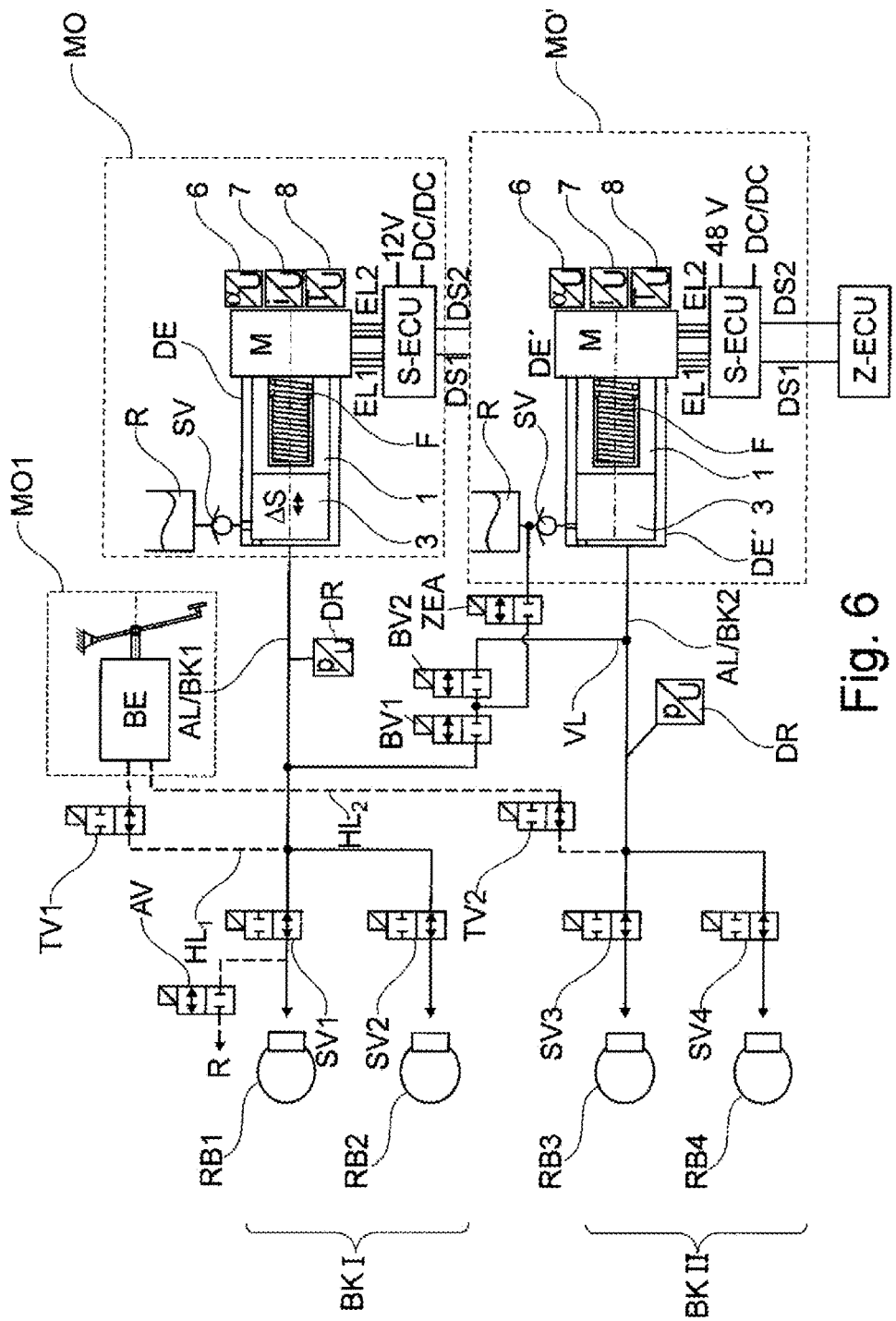

FIG. 5a shows a possible valve circuit in the main module for all embodiments;

FIG. 5b: shows an inlet valve according to the invention for main module and valve circuit as per FIG. 5a;

FIG. 6: shows a preferred hydraulic concept for the second, third and sixth embodiment;

FIG. 7: shows a configuration of a double-stroke piston-type pump with solenoid valves for pressure feedback control of the two working chambers, which are assigned to in each case one brake circuit.

FIG. 1a shows a first possible embodiment of the device according to the invention with a main module MO for pressure feedback control in two hydraulic circuits or brake circuits BK1 and BK2 and with an additional module MO1 with actuating device, wherein the main module MO and the additional module MO1 are connected to one another via an electrical data and/or control line DS and a hydraulic line HL. The additional module MO1 may have an actuating device such as for example a brake pedal in the case of a vehicle or a brake lever of a motor cycle. A travel simulator may additionally be arranged in the additional module MO1. If yet another piston-cylinder unit is arranged in the additional module, the piston of which is adjustable by means of the actuating device, a fall-back level can be realized by means of the optional hydraulic connection, such that, in the event of a failure of one component of the main module, a brake pressure can still be built up in one or both brake circuits BK1/BK2 by means of the actuating device.

A travel transducer PS and/or a level transducer NG may also be arranged in the additional module MO1. Here, the travel transducer PS detects the deflection of the actuating means, for example in the form of a brake pedal or brake lever, wherein the signal thereof is transmitted via the electrical line DS to the control devices S-ECU and M-ECU.

For all following exemplary embodiments, the valve arrangement HCU may be arranged between the controller S-ECU of the module and the motor M with the pressure supply device DV.

It is likewise basically the case for all embodiments described and illustrated in the figures that an additional superordinate control device M-ECU may also be provided in addition to the controller S-ECU. It is however also possible for the superordinate control functions to also be jointly performed by the S-ECU provided in the module MO according to the invention, such that it is basically also possible to dispense with a superordinate controller. The superordinate control unit M-ECU illustrated in FIG. 1a may thus also be integrated in, or form, the main module MO.

In modern systems, such as for example the motor or transmission controller and also the ESP function, the system controller S-ECU performs substantially all functions such as I/O, calculation, activation of the actuating elements and the diagnostics function. In future, increased use will be made of domain or central processors M-ECU, in the case of which the ECU is arranged at or in the vicinity of the respective assembly and which in particular perform only activation functions and partial diagnostic functions.

The module MO is fastened in the motor compartment by means of brackets DF, which may also have damping characteristics.

The system illustrated in FIG. 1a may thus be used for supplying pressure to a system with two hydraulic consumers or brake circuits, and also in the case of an active brake system with a traction motor and also in a two-wheeled vehicle (front-wheel and rear-wheel brake) and/or for systems with axle-by-axle blending and brake force boosting/blending at one axle (motor racing with drive motor at one axle and hydraulic brake force boosting and also blending at the wheel brakes of one axle), simple vehicles only with different brake force distribution at the axles without ESP/ABS function.

The actuating unit BE may have a single-circuit master cylinder HZ or a two-circuit tandem master cylinder THZ, and at least one isolating valve TV1, TV2, in order to selectively produce or close off the hydraulic connection between a working chamber of the master cylinder or both working chambers of the two-circuit THZ of the actuating device BE to one or two brake circuits BK1, BK2.

FIG. 1b shows a device which is similar to the device according to the invention illustrated and described in FIG. 1a and in the case of which two main modules MO and MO' are provided for the purposes of increasing dynamics, in particular for motor racing. Furthermore, an additional module MO1 with actuating device is provided, wherein the additional module MO1 is connected by an electrical data and/or control line DS to a superordinate controller M-ECU and to a traction motor and to the main modules MO and MO'. The two main modules may in this case, by means of a multiplexer function, be operated with classic switching valves and possibly also with outlet valves and can thus be used as a pure brake force booster or as a brake force booster with ABS and/or ESP function. Thus, the main module MO may be provided for pressure feedback control of the wheel brakes of the wheel axle 1 and the main module MO' may be provided for pressure feedback control of the wheel brakes of the wheel axle 2. A diagonal supply of pressure to the wheel brakes by means of the main modules MO and MO' is however likewise possible. A hydraulic fall-back level for the main module MO is realized or possible by means of the hydraulic connection HL between additional module MO1 and the main module MO. Axle-specific or wheel-specific pressure feedback control with high dynamics and feedback control accuracy is thus possible. With such a system, it is possible to achieve the same functions with fewer components and lower costs in relation to an electrical brake (EMB, wedge-type brake).

FIG. 1c shows a device according to the invention with two main modules MO and MO' for a brake-by-wire brake system or an autonomously driving vehicle without a brake pedal and with two traction motors TM1 and TM2, wherein the main module MO performs the pressure feedback control of the wheel brakes RB in axle 1 via the connection lines AL1 and AL2, and the main module MO' performs the pressure feedback control in the wheel brakes of the axle 2. A superordinate control device M-ECU controls the brake function of the wheel brakes RB and of the traction motors TM1 and TM2.

The valve design and hydraulic circuit as illustrated and described in FIGS. 5 and 6 is expedient in the case of the devices as per FIGS. 1b and 1c.

FIG. 2a shows a device according to the invention with a main module MO for pressure feedback control in four wheel brakes RB and an additional module MO1 with actuating device, wherein the main module MO and the additional module MO1 are connected to one another via an electrical data and/or control line DS and a hydraulic line HL. The hydraulic line HL serves, as described in the proceeding exemplary embodiments, as a fall-back level. The motor M of the main module MO for the pressure supply device may for example be a six-phase motor, whereby adequate redundancy is provided by means of the two times three phases. In the event of a failure of an electronic system, it is then possible for the electric motor to still generate half of the torque and, in the case of the system being designed for 160-200 bar, to still attain 80-100 bar. Since 80-100 bar constitutes the locking brake, it is thus possible for approximately the full braking deceleration to be achieved even in the event of a failure of one motor. The pressure supply device may furthermore have a double-stroke piston which, by means of its two working chambers, likewise offers twofold redundancy in the hydraulic circuit. By means of the pressure supply device of the main module MO, it is quasi possible to realize the ABS and/or the ESP function in the wheel brakes aside from the brake force boosting, blending and driver assistance function. In the event of a failure of one part of the electronic system, the full ABS performance cannot be achieved with the remaining three phases owing to the reduced power. Safety-critical interventions in ESP and restricted ABS performance with relatively low performance, resulting for example in a lengthening of braking distances with ABS, are however still possible.

The additional module MO1 may be arranged on the bulkhead of the vehicle, whereas the main module MO may be arranged virtually arbitrarily in the motor compartment, in particular remote from the bulkhead for the purposes of noise minimization. Since hydraulic vibrations are difficult to dampen by damping of the mounting of the mechanism, because said vibrations are transmitted via the liquid to the brake pedal by means of body-borne sound, this arrangement is highly effective in the context of the noise minimization.

FIG. 2b shows a device according to the invention as per FIG. 2A, but without a hydraulic connection between main module MO and additional module MO1. This system can be used for example in mass-production passenger motor vehicles for autonomous driving and is very quiet, wherein the main module MO is connected via its four output lines $AL_{1-4}$ to the respective wheel brakes RB. It is likewise possible for the respective brake circuit BK1 or BK2 not to be assigned to one axle 1/2 but to be assigned to in each case two wheel brakes situated diagonally with respect to one another. For sufficient redundancy and safety, aside from the 6-phase motor contacting (see FIG. 2a), a redundant signal transmission and redundant connection of the main module MO to two on-board voltage networks: (a) connection to 12 V and (b) connection to DC/DC converter of a second voltage level, is also possible here.

FIG. 2c shows a device according to the invention, wherein two pressure supply devices with respectively separate electromotive drives M and gearings are arranged in the main module MO. Through the provision of two pressure supply devices, twofold redundancy is realized. Furthermore, by means of two motors, increased performance, see FIG. 1c, can be achieved. It is expediently possible in the case of this system to use the valve circuit as illustrated and described in FIGS. 5 and 6.

FIG. 2d shows a device according to the invention with a main module MO for a brake-by-wire brake system or an autonomously driving vehicle without brake pedal for the supply of pressure to four wheel brakes. Here, the redundancies as set out in FIG. 2b (2×3 phases, redundant signal transmission and voltage supply), and a double-stroke piston-type pump with two working chambers, are imperatively required.

FIG. 3 shows a cross-sectional illustration of the motor M, drive, of the pressure supply device DK, valve arrangement HCU and of the control and feedback control unit ECU with the main components thereof, which are arranged in the main module MO.

The motor housing 16 is connected via the intermediate piece 32, which is composed of preferably sound-deadening material, to the first housing part GH1, wherein the centering may be realized by means of projection 14b. Motor housing 16 and intermediate piece 14 and ECU housing 35 are sealed off, for example with rectangularly hatched surfaces, which are not individually described. A four-point bearing 20 is pressed into the motor housing 16, which four-point bearing accommodates the axial forces in both directions from the spindle 25 and rotor 22 and centers these. The rotor 22 is secured by an axial securing means 29 and, in the stator region, bears the customary rotor laminations 19 with magnets 20.

The rotor 22 is furthermore connected at a face side to a bevel toothed gear 28, which drives the second bevel toothed gear 29 with shaft 41 and target 38. The latter acts on the sensor element 37, which evaluates the rotor rotation. Here, the sensor element is seated on the system circuit board PCB and is particularly inexpensive and fail-safe. As an alternative to the mechanical solution, a solution may be implemented which is not illustrated and in which, instead of the connection to a bevel gear, the rotor is connected to a sleeve which comprises magnets and which thus forms the target 38 for the evaluation of the rotational angle of the motor. The target magnetic field may in this case be detected by means of corresponding arrangement of the sensor element in the vicinity of the target (for example by means of plug connection to ECU) or may be conducted by means of magnetic flux-conducting elements to the remote sensor element on the PCB.

The bevel toothed gear 29 is mounted in a housing 40 which is connected to the motor housing 16. The toothed gear 20 is mounted in the housing with radial play SR in order that the flexible drive shaft 41, with corresponding bracing, does not generate any tooth play. Here, the shaft is mounted in the bearing bushing 41, which is fastened in the intermediate piece 14. The shaft 41 is connected rotationally conjointly to the toothed wheel 29, for example by means of a corresponding profile with rotation prevention means. The flexural rod BS is fastened by means of the nut 23 to the rotor 22. Said flexural rod is connected rotationally conjointly to the spindle 25, for example by means of a welded connection 30. The spindle 25 acts on the KGT nut 26, which is connected rotationally conjointly to the piston 11 by means of, for example, a thread 27. During the rotation of rotor and spindle, the radial tolerances give rise to a spindle runout, which generates correspondingly high transverse forces on the piston, which are critical for the running surfaces of the seals DK. The flexural elasticity of the bending rod BS reduces this to small values. This principle may also be applied in the case of a static spindle (not illustrated) and rotating nut. The piston is in this case designed as a stepped piston and, in the case of a small stroke, yields a short structural length. As illustrated by the sectional drawing, the structural length is made up of stroke H1+H2=2×H1+L of KGT nut. Since said one lies within the motor, a hollow-shaft motor, corresponding to DE 10 2008 063 772 by the applicant, the actual motor structural length made up of stator and bearings is not included in the structural length. The clearance of the stroke component H1 is utilized for the lead frame 31 of the winding that is connected to the winding wires. It is additionally also possible for the motor sensing means 28-29 to be accommodated here, as already stated.

The piston is sealed off by means of three seals DK in order to seal off the corresponding pressure chambers, which will not be discussed in any more detail here, nor will the design of the intermediate piece 14 and first housing part (GH1) that is optimal for this purpose.

The KGT nut with piston requires a rotation prevention means, which here is mounted on an end side. A corresponding part 33 with a tetragonal or polygonal profile is connected rotationally conjointly to the GH1 and is supported on a slide bushing 34 which is connected rotationally conjointly to the piston. This sliding guide benefits from the small lubricating action of the brake fluid. The piston drive may also be designed with a static spindle and rotating KGT nut. Accommodated on one side of the GH1 are the suction valves SV1 and SV2, which are connected by means of corresponding ports to the VB. As indicated by dash-dotted lines, these may be arranged on the H2 plane in a tubular element. Arranged on the opposite side is the GH2-HCU, which, as already described, accommodates the magnetic valves MV and other valves with pressure transducer. Here, at the top and at the bottom, it is possible to clearly see very short connecting bores of GH1 and GH2.

Connected to the GH2 is the ECU housing, which accommodates the PCB with the structural elements BE. Also described here is the short electrical connection to the motor of lead frame 31 to motor contact KM, in the vicinity of which on the PCB the power contacts of the plug connector 1 to the BE for the motor control are arranged. The corresponding power losses are dissipated from the PCB via a thermally conductive body to the valve block 56 of the HCU. The ECU housing 35 may be formed parallel and laterally with respect to the motor. With this arrangement, it is possible to inexpensively realize an advantageous compact solution which takes many demands into consideration.

FIG. 4 shows a cross-sectional illustration through a main module MO, wherein a trapezoidal spindle TS is illustrated in the upper half of the drawing and a ball screw drive KGT is illustrated in the lower half of the drawing. The main module has a piston housing 53 and a motor housing 55. The piston housing 53 and the motor housing 55 may be manufactured from metal or plastic. In the case of an operating pressure in the working chamber of over 100 bar, at least the piston housing 53 should no longer be manufactured from plastic. The outer stator 52 and the stator windings 51 are arranged in the motor housing.

The piston housing 53 has a working chamber A which is delimited by the housing 53 and the piston 59 and which has an outlet 61 for the connection of an output line AL (not illustrated). The piston 59 is sealed off by means of seals 50 situated in the piston housing 53 and is driven by means of a spindle SP arranged rotationally conjointly on the pot-shaped rotor R. The rotor R is mounted rotatably in the motor housing 55 by means of bearings 60.

A rotation prevention means 54 prevents the undesired rotation of the piston 59 about its longitudinal axis. The spindle may in this case be a trapezoidal spindle TS (upper half of the drawing) or part of a ball screw drive KGT. The spindle SP may be fastened to a flexural rod 58 which is connected rotationally conjointly to the rotor R, whereby compensation in the presence of a possible eccentricity is realized.

A rotary encoder 56 for the motor and electrical connections 57 are provided in the controller S-ECU.

If no excessively high operating pressures prevail, both the piston housing 53 and the piston 59 can be manufactured from plastic. The motor housing 55 can likewise be manufactured from plastic. In a further possible embodiment, the stator 52 can also be manufactured from plastic.

It is furthermore possible for the rotor R or parts of the rotor R to also be manufactured from plastic, wherein magnets with magnetic flux conducting pieces are inserted into or enclosed by the plastic.

FIG. 5a shows a valve circuit known from WO 2016/146223 with switching valves with a low flow resistance, which is important for multiplex operation, wherein the switching valves are arranged such that they automatically open owing to the pressure in the wheel brakes. Here, the hydraulic medium flows from the brake circuit or the pressure generator unit via the armature space to the valve seat in the direction of the wheel cylinder. If a fault arises, then the wheel pressure opens the switching valve. The magnetic force must however also realize closing counter to 130 bar, which is however realized in the case of a small armature air gap in the valve end position. The resetting springs of the switching valves SV therefore require only slight strengthening in order that the switching valve does not "abruptly close" in the presence of a correspondingly large volume flow. Since conventional inlet valves must close counter to up to 220 bar—in the case of FIG. 5a, 130 bar—it is possible, with unchanged magnet dimensioning, to enlarge the valve seat area, which results in a lower back pressure or flow resistance and is advantageous for MUX operation. The valve circuit illustrated in FIG. 1e is therefore advantageous for the brake system according to the invention.

FIG. 5b shows a possible embodiment of the inlet valve EV according to the invention and the connection to the brake circuit BK and the pressure supply DV and the wheel brakes RBi.

The inlet valve EV has a magnet armature MA, a magnetic main body MGK and an exciter coil ES. If the solenoid valve EV is energized, the magnetic force MK displaces the armature MA from the position $S_{A0}$ into the position $S_{A2}$ by the differential travel $S_A$. The magnet armature MA moves a plunger MStö by the same travel, such that the plunger MStö comes to bear against the valve seat VS and closes the outlet Ea of the solenoid valve. At this location, the armature MA still has a residual air gap $S_0$ to the magnetic main body MKG, which is provided such that, when the energization of the exciter coil ES of the valve EV is deactivated, the armature MA does not adhere to the magnet housing MGK owing to remagnetization losses of the iron circuit. When the valve current is deactivated, the resetting spring RF moves the armature MA back into the initial position. Here, the magnetic force $F_M$ increases in the case of a relatively small air gap, that is to say with increasing travel, in non-linear fashion. The resetting spring $F_{RF}$ is dimensioned such that, in the initial position SAO, the magnetic force $F_M$ is greater than the spring force, in order that reliable closing of the valve is ensured. The spring force increases with increasing travel $S_A$, and in the end position $S_{A2}$, is likewise lower than the magnetic force $F_M$. A linear spring is preferably used in order that, in the end position, in the presence of a given current, the magnetic force $F_M$ is considerably higher than the resetting force, such that the valve can be held with low current, and reliable closing is ensured even in the presence of large pressure differences between wheel brake and pressure supply. The holding action is ensured even in the presence of large pressure differences, because the magnetic force greatly increases in non-linear fashion in the closed valve position. The resetting spring must however also be dimensioned such that the function as a normally open valve can be ensured, and the valve always reliably opens.

The output $E_a$ of the valve is connected to the wheel brakes RBi (RB1-RB4), the input $E_i$ is connected to a brake circuit BKi and/or to the pressure supplier unit DV (20). By means of such a connection, the inlet valve EV can be opened both by the resetting spring RF and by the pressure in the wheel brake, which is highly important in particular in the event of a fault or failure of the brake system (for example in the event of failure of the voltage at the valve). Furthermore, in the presence of high pressures in the brake circuit and low pressures in the wheel brake, it is also the case that only the pressure difference between inlet Ei and outlet Ea acts on the plunger $Ms_{t\ddot{o}}$. This pressure difference at the valve is relatively low during the pressure build-up, but must be taken into consideration in the spring configuration RF in order that the pressure difference does not lead to the valve being pushed closed during the pressure build-up when the volume is conveyed from the pressure supply DV into the wheel brake. Valves with a large opening cross section ÖQ or low flow losses reduce this effect.

The above-described valves with large opening cross section can be used in particular in the case of a pressure build-up with pressure volume control or time control with a small pressure difference between admission pressure and actual pressure in the wheel brake, because the feedback control accuracy is very high. This in turn has advantages that only low flow losses arise, in particular during the fast pressure build-up (TTL), and the drive motor requires only a low level of power for the fast pressure build-up in an extremely short time (TTL=150 ms).

Furthermore, owing to the low flow losses of the advantageously designed inlet valves, a dissipation of pressure can be performed quickly via the inlet valves. A precise dissipation pressure via the inlet valves EV can be performed through corresponding control of the piston movement of the pressure supplier unit 20. It is optionally also possible to implement the known MUX method with the above-described valve circuit, or with the pressure dissipation control by means of outlet valves AV in a brake circuit, in particular for consumers with a low volume balance, such as for example the wheel brakes of the rear axle. That is to say, a combination is also possible whereby the MUX method is used in conjunction with the new valve circuit configuration only in two wheel brakes (for example front axle) and the pressure dissipation is performed conventionally at two further wheel brakes. This would mean that two wheel brakes/actuators with inlet and outlet valves (SV1, SV2+AV) are provided, and two wheel brakes/actuators only with inlet or switching valves SV3, SV4. In this case, it would be possible for only the wheel brakes of the front axle to be equipped with the new valve circuit according to the invention as per FIGS. 1a and 1b, and for a standard circuit configuration/standard valves to be used at the rear axle.

FIG. 6 shows a brake system with the device according to the invention, composed of two main modules MO and MO' and a further, separate module MO1 with an actuating unit BE and a brake pedal.

Said actuating unit BE in the module MO1 may for example act hydraulically and be connected to the module MO, or may be an electrical brake pedal or a go-stop switch. The main module MO comprises a motor M, a control unit S-ECU, and a pressure-generating unit DE composed of a cylinder, a piston 1 moved therein by the motor M. The piston 1 is driven by means of a spindle S and, together with the cylinder, delimits the working chamber 3, which is connected via the suction valve SV to a reservoir vessel R. The working chamber 3 is furthermore connected via the output line AL of the module MO to the first brake circuit BK1, to which the two wheel brakes RB1 and RB2 are connected with the interposition of the switching valves SV1 and SV2. The pressure build-up and pressure dissipation in the wheel brake RB2 is performed here in each case via the opened switching valve SV1 or SV2 or simultaneously if both switching valves are open. Here, the piston 1 of the pressure generator unit MO is controlled by means of advancing stroke or retraction stroke. When the switching valve SV1 is closed, the pressure in the wheel brake is conserved. If the outlet valve AV is not present in the case of the wheel brake RB1, the pressure build-up and pressure dissipation in the wheel brake is performed by means of the opened switching valve SV1 thereof by means of advancing stroke and retraction stroke of the piston.

The pressure dissipation in the wheel brake RB1 may be realized selectively via the outlet valve AV in the direction of the reservoir vessel R or the switching valve SV1 into the working chamber 3 of the piston-cylinder unit. For a controlled dissipation of pressure, it is furthermore possible for the outlet valve to be operated with clocks operation (open/closed) or pulse width modulation, that is to say fast clocking or opening and closing, in particular by means of a common outlet valve (AV) designed for pulse width modulation, wherein the pressure sensor DR is used for the control of the clocking of the outlet valve during the pressure dissipation. The pressure dissipation in RB2 can also be performed via the outlet valve AV with switching valves SV1 and SV2 open, wherein a controlled pressure dissipation can likewise be realized by clocking of the outlet valves utilizing the pressure transducer. Here, the piston of the piston-cylinder unit MO is preferably stationary. It is also possible for the piston to be moved during the pressure dissipation and to additionally be used for controlling the pressure dissipation by virtue of volume being replenished and jointly controlling the pressure dissipation. In this case, the pressure is dissipated simultaneously in both wheel brakes RB1 and RB2. It is self-evidently also possible for a corresponding outlet valve (not illustrated) to be provided for the wheel brake RB2. If an outlet valve is provided, it is possible for pressure to be simultaneously built up in RB2, while pressure is simultaneously dissipated in RB1. If an outlet valve is provided in the case of RB2, it is possible for the pressure to be simultaneously built up in any wheel brake of the brake circuit BK I or BK II and to be simultaneously dissipated in another wheel brake of the brake circuit BK I or BK II. The use of outlet valves is advantageous in particular in the case of a black-white distribution of brake circuit (BK I for front axle, BK II for rear axle) in order to relieve the motor of load in the pressure feedback control dynamics in MUX operation. It is alternatively also possible for an outlet valve to be provided at other wheel brakes (for example RB1 and RB3). This is expedient for example if RB1 and RB3 project the wheel brakes of the front axle in the case of a diagonal brake force distribution.

In the main module MO, there are also arranged sensors 6, 7 and 8 for determining the rotational angle α of the motor, the motor current i, and the temperature T. The pressure in the brake circuit BK1 can be determined by means of the pressure sensor DR.

By means of the sensors, the feedback control can be refined, and the pressure actuation can be performed only by means of the position feedback control of the piston and current feedback control of the motor. The temperature sensor serves for this purpose for aligning the torque constant kt with the operating temperature. In this system, the pressure transducer is used primarily for the calibration and fine feedback control to the target pressure, wherein, by means of current and position, in accordance with evaluation of the pressure-volume characteristic curve, very fast pilot control is realized and is used primarily for highly dynamic pressure changes. With more exact modelling of the hysteresis, it is also possible for the pressure transducer to be omitted entirely, or only one pressure transducer in one of the brake circuits BK I or BK II is used only for calibration purposes. For the calibration, the bypass valves BV1, BV2 are opened in order that the respective pressure feedback control unit can be calibrated with the pressure transducer. If one or more outlet valves are used in one brake circuit BK I, the pressure transducer is expediently arranged in BK I, in order that it is available for the clocking of the pressure dissipation feedback control in the brake circuit BK I.

The voltage supply of the main module MO is preferably of redundant configuration, by virtue of the main module being connected firstly directly to the terminals of a 12 V battery and secondly via a DC/DC converter to a second supply source. The data lines DS1 and DS2 are also of redundant configuration and are connected to the central control unit Z-ECU of the on-board electrical system.

The second main module MO' is of virtually identical design to the first main module MO and is connected by means of its hydraulic output line AL to the second brake circuit BK2, via which the pressure build-up and pressure dissipation is performed in the wheel brakes RB3 and RB4. The only difference in relation to the first main module MO consists in that the voltage supply is realized by means of the 48 V battery and a DC/DC converter, whereby greater redundancy is realized. A pressure sensor DR may likewise be provided for the second brake circuit BK2.

If one unit (MO) or MO2 fails, it is possible for all wheel brakes to be operated in MUX operation by means of the remaining pressure supplier unit MO2, by virtue of the bypass valves BV 1 and BV 2 in the connecting line VL being opened, and the brake circuits BK I and BK II being connected to one another. Since only one motor is then available, the maximum dynamics in ABS/ESP feedback control operation are restricted. Here, outlet valves are of assistance in particular in feedback control operation, wherein at least one outlet valve is provided at one or two wheel brakes (RB1/RB2 or RB1/RB3), in particular the front-axle wheel brakes. In order to prevent a volume displacement or piston displacement of the non-defective motor, the drives MO and MO' are designed with a self-locking mechanism, in particular a self-locking trapezoidal spindle F. Alternatively, it is possible to use on a shut-off valve that would otherwise have to be connected upstream of the non-self-locking pressure supplier device (not illustrated in FIG. 6).

The bypass circuit may also expediently be utilized such that the pressure build-up in individual wheel brakes (for example wheel brakes of the front axle BK I) is realized jointly by opening the bypass line through both pressure supplier units, see if, at one axle (for example BK II), a high-powered electric drive motor of an electric motor (50-200 kW) is available for the braking action at at least one axle. Thus, the motor of a module MO/MO1 can be downsized and, in terms of power, needs to be designed only for the ABS/ESP feedback control function.

For the dimensioning of the pressure actuators DE and DE' of the modules MO and MO', the following possibility is also expedient:

DE: dimensioned for high pressure of approximately 200 bar wherein volume 50% of the volume of DE'

DE': approximately 50% of the pressure of DE, that is to say approximately 100 bar, volume 100%

DE and DE' thus have the same power. The DE piston can be dimensioned with 50% of the piston area of DE' piston, whereby only 50% of the axial force of DE' is required. Thus, both motors M have the same torque.

In the event of failure of DE in the fall-back level (RFE), DE' acts with 50% pressure, which is adequate and DE with 100% pressure and smaller volume and requires a replenishment of DE by retraction stroke for drawing in and advancing stroke for further volume with corresponding valve circuit with SV closed during the retraction stroke.

Furthermore, by replenishment, that is to say retraction of the piston, further volume can be drawn in by opening the bypass valve BV1/BV2 or the bypass valves BV1 and BV2 by means of opening of the ZEA valve, and thus the volume balance of the pressure chambers can be reduced. It is thus furthermore possible to generate small cross-sectional areas of the end surfaces of the pistons 3, whereby, in turn, the torque demand on the motors M can be reduced. This has a significant effect on the costs. Since the pressure generator unit is not arranged on the bulkhead, and the length is not limited by structural space restrictions (for example crash requirements), the working chamber of the pressure generator unit can be of elongate design with small cross-sectional areas, that is to say the cross-sectional area is expediently reduced 30-50%, and the length of the working chamber 3 is increased by the same length. In this way, the torque and the costs of the motors M and of the spindle drives F can be further reduced. It is thus possible to utilize the physical effect whereby a relatively low torque of motors can be compensated by relatively high rotational speed of the motors, and thus does not lead to power reductions of the drive unit. Since the increased noise of the actuation owing to higher rotational speeds is easier to dampen in an arrangement remote from the bulkhead than at the bulkhead, this parameter can be expediently utilized for cost reduction of the drive units, that is to say the drive units MO and MO' can, in an elongate embodiment, be designed with the same power while being considerably less expensive. Furthermore, by contrast to known 2-box brake systems, in the event of failure of the ABS/ESP unit, one module MO or MO' can perform the brake force boosting and feedback control function ABS/ESP at all wheel brakes through utilization of the bypass line VL.

The connecting line VL has one switching valve SV1 and optionally 2 bypass valves BV1 BV2 and one discharge valve ZEA, wherein, by opening one or both bypass valves, a hydraulic connection is produced between the two brake circuits BK I and BK II. A bypass valve has cost advantages and low throttling resistances but places high demands on the leak-tightness in particular during feedback control operation, multiple bypass valves BV1 and BV2 permit a reliable leak-tightness test and additionally permit further degrees of freedom in the system. The bypass valves are preferably designed as normally closed solenoid valves. For this purpose, however, for the emergency operation of both brake circuits, it must be ensured by means of a pressure supplier unit that the valves are still supplied with current even in the event of a failure of a pressure supply, that is to say the bypass valves are expediently served by S-ECU of the pressure supply MO and MO1.

The bypass circuit with two valves (BV1 and BV2) is advantageous in the case of the drawing-in of liquid from the reservoir vessel via central outlet valves (ZEA) for the replacement in one of the brake circuits, inter alia for further increasing pressure. Alternatively, the replenishment may also be realized by drawing-in of volume via the suction valve from R or R' by retraction stroke of the piston of the DE with simultaneously closed valve SV. During the advancing stroke, said volume is then available to the brake circuits BK I and BK II.

The bypass valve circuit is composed of in each case one bypass solenoid valve BV1 and BV2 with central ZEA solenoid valve to the reservoir vessel. This is consumed by virtue of the corresponding volume being discharged into the reservoir vessel and for the drawing-in for the replenishment from the reservoir vessel.

Said EA solenoid valve can be of large dimensions in cross section (in particular >5 mm$^2$), which is required for fast drawing-in. Said valve is opened for above-stated functions or for diagnostics. As already mentioned, the bypass solenoid valves are temporarily open. A possible leak is in this case detected by means of the known assignment of pressure or motor current to the piston stroke. In a known manner, MUX systems have the pressure-volume characteristic curve in the memory.

The actuating unit BE is optionally hydraulically connected via the hydraulic lines HL1 and HL2 to the two brake circuits BK1 and BK2, wherein switchable shut-off valves TV1 and TV2 are arranged in the hydraulic lines HL1 and HL2. Said shut-off valves are preferably normally open, such that, in the event of a fault, in the event of failure of the DE and a blocking drive, the valves TV1 and TV2 open and a hydraulic pressure can be built up in the brake circuits BK1 and BK2 by means of the brake pedal and the piston-cylinder unit of the actuating unit BE, whereby a fall-back level is realized. During normal operation, the valves TV1 and TV2 are closed, and thus the actuating unit BE is decoupled from the brake circuits BK1 and BK2.

Via the open valve BV1, it is possible for a pressure change to be performed in the wheel brakes RB1 and RB2 for example by means of the pressure-generating unit DE of the second main module MO'. Conversely, a pressure change in the brake circuit BK2 can also be performed by means of the pressure-generating unit DE of the first main module when the valve BV1 is open.

By means of the pressure-generating devices, the pressure change in the wheel brakes RB1-4 can be performed in a time-offset manner and/or simultaneously, which is generally also referred to as multiplex operation MUX. One or more outlet valves AV may be provided by way of assistance.

By contrast to systems with a ball screw drive, it is possible in the case of a configuration of the pressure supply with a trapezoidal spindle to omit an isolating valve (not shown) at the output of the pressure supply, because, owing to the self-locking, in the fall-back level with isolating valve TV1 (TV2) open, the piston is not adjusted, and the pedal actuation generates a braking force in the wheel brakes. The trapezoidal spindle solution therefore has particular advantages for multiplex operation, because no throttling losses arise.

Alternatively, the switching valves SV1-4 between pressure supply of the main module and wheel brake may be omitted, wheel-specific feedback control is omitted, that is to say no ABS/ESP feedback control is part of the function.

The outlet valve AV already described above may be provided for example for the front axle or one brake circuit in order to achieve greater dynamics in the pressure feedback control, which is expedient in particular in critical situations (high-µ braking, that is to say braking on asphalt) for the purposes of shortening braking distances.

The feedback control of the piston movement can be realized by means of the position a, current i and temperature T. The pressure transducers DR serve only for the purposes of alignment or calibration. In principle, only one pressure transducer DR is necessary, because the brake circuits BK1 and BK2 are connectable to one another by means of the valve BV1 (normally closed).

In the event of failure of one pressure supply unit DE, the pressure supply unit DE of the other main module can, via the open connecting valve BV1, perform the pressure change in both brake circuits in emergency operation. If the spindle drive of the pressure supply units DE is of self-locking design, the piston of the defective pressure supply unit DE is not adjusted. If a ball screw drive is used, an additional isolating valve is required upstream of the infeed from the other brake circuit between DE and switching valve SV/isolating valve TV for this function.

If no self-locking ball screw drive is used, self-locking can be generated by means of a generated or switched short circuit in the motor M.

Owing to the temperature-induced hysteresis of a trapezoidal spindle, different pressure-volume/travel assignments arise at different temperatures. By measuring the temperature, it is advantageously the case that only a pressure transducer measurement range up to 80 bar is necessary for alignment purposes.

To achieve greater dynamics of the pressure change, the main module MO with relatively high dynamics demands in the closed brake circuit, that is to say without AV, can be connected for example to a 48 V battery or to the 48 V output of a DC/DC converter.

FIG. 7 shows a brake device with a pressure supply unit DE, the piston 1 of which is adjusted by a motor M, wherein the piston 1 sealingly separates two working chambers 3a and 3b from one another, wherein each working chamber is connected via a hydraulic line H3, H4 to one brake circuit BK1 and BK2. By means of additional switching valves PD1 and PD2, the working chambers can be selectively connected to the reservoir vessel 5. The pressure build-up and pressure dissipation is realized by means of piston control in both directions and opening/closing of the PD1/PD2 valves. By means of the connecting valve BV, the brake circuits BK1 and BK2 can be hydraulically connected to one another. Additionally, a valve VKF can be connected upstream of the pressure supplier unit. It is thus possible to build up and dissipate pressure in the two brake circuits BK I and BK II in both stroke directions of the double-stroke piston (advancing and retraction stroke). This redundancy is required in particular in vehicles in stage 3 to 5 autonomous driving operation, where both the motor must be of redundant configuration, for example with 2×3 phase connections, that is to say operation with half torque in the event of failure of one 3-phase connection, and also the hydraulics must be redundant, in particular two working chambers, that is to say operation of both brake circuits is possible with only one chamber of the double-stroke piston. The main module is supplied by means of the 12 V and/or 48 V on-board electrical system. A redundant supply of energy is additionally realized by means of corresponding DC/DC converters. The exciter coils of the motor M are connected by means of redundant feed lines EL1 and EL2.

What is claimed is:

1. A drive and braking system for a vehicle with a central domain control architecture and further with two brake circuits, comprising:
    at least one traction motor configured to be operated as a generator to brake a wheel or an axle of the vehicle;
    a pressure supply device, driven by an electromotive drive and controlled by a controller, and configured to change pressure in the vehicle's two brake circuits, wherein the pressure supply device and the controller are comprised by a main module, wherein the controller has a redundant power supply with two on-board electrical systems of the vehicle, wherein an electronic circuit board of the controller has two three-phase feed lines, and wherein drivers for each three-phase feed line are configured galvanically separated;
    a superordinate control device, which is electrically connected to the controller of the pressure supply device and to the traction motor;
    wherein the superordinate control device is configured to control a brake function of the traction motor;
    wherein the system further comprises an additional module with an actuating device, wherein the main module and the additional module are connected to one another via an electrical data and/or control line and a hydraulic line;
    wherein a piston-cylinder unit with a single-circuit master cylinder is arranged in the additional module, a piston of which is adjustable by means of the actuating device;
    wherein the additional module is connectable via a valve arrangement to at least one brake circuit or to at least one hydraulic consumer.

2. The drive and braking system according to claim 1, wherein the superordinate control device is configured to control one or more of the following functions of the drive and braking system:
    brake force boosting,
    blending,
    anti-lock braking (ABS),
    electronic stability control (ESP),
    emergency braking, or
    distance control.

3. The drive and braking system according to claim 1, wherein the additional module comprises an actuating unit comprising a travel simulator with a brake pedal that is configured to be arranged at a bulkhead of the vehicle.

4. The drive and braking system according to claim 3, wherein the travel simulator operates electrically or hydraulically.

5. The drive and braking system according to claim 4, wherein the actuating unit has at least one travel transducer and is connectable via the valve arrangement to one brake circuit or exactly two wheel brakes.

6. The drive and braking system according to claim 5, wherein the actuating unit has a reservoir vessel, a level transducer and at least one isolating valve, wherein the at least one isolating valve serves to selectively open or close a hydraulic connection between a working chamber of the master cylinder and a brake circuit.

7. The drive and braking system according to claim 6, wherein the actuating unit is formed as a structural unit with the master cylinder, the travel simulator, the level transducer, the reservoir vessel and the travel transducer.

8. The drive and braking system according to claim 3, wherein:
    the actuating unit is arranged spatially separated from the main module in a motor compartment; and
    the main module is configured to be fastened in the motor compartment by means of brackets.

9. The drive and braking system according to claim 1, wherein the additional module comprises an actuating unit that is configured such that it is able to be actuated by means of a brake pedal or a brake lever.

10. The drive and braking system according to claim 3, wherein
    the pressure supply device comprises a double-stroke piston with two working chambers, wherein each working chamber of the double-stroke piston has connections to a respective hydraulic circuit for a two-circuit brake system; and wherein, by means of the two stroke directions of the double-stroke piston, pressure is able to be built up or dissipated;

wherein, at a pressure dissipation via the double-stroke piston, the piston is moved and a hydraulic connection is formed via a switching valve.

11. The drive and braking system according to claim 3, wherein
the pressure supply device of the main module is configured redundantly by the main module including a second pressure supply device, or by the pressure supply device having a double-stroke piston,
wherein the controller is configured redundantly with separate drivers for each electromotive drive,
wherein the main module has a redundant power supply and a redundant data line to the superordinate control device.

12. A method of operating the drive and braking system according to claim 3, wherein the method comprises:
controlling a brake function of the traction motor, and
controlling one or more of the following functions of the drive and braking system:
brake force boosting,
blending,
ABS,
ESP,
emergency braking, or
distance control.

13. A drive and braking system for a vehicle with a central domain control architecture and further with two brake circuits, the system comprising:
at least one traction motor configured to be operated as a generator to brake a wheel or an axle of the vehicle;
a pressure supply device, driving by an electromotive drive and controlled by a controller, and configured to change pressure in the two brake circuits, wherein the pressure supply device and the controller are comprised by a main module, wherein the controller has a redundant power supply with two on-board electrical systems of the vehicle, wherein an electronic circuit board of the controller has two three-phase feed lines, and wherein drivers for each three-phase feed line are configured galvanically separated;
a superordinate control device, which is electrically connected to the controller of the pressure supply device and to the at least one traction motor, wherein the superordinate control device is configured to control a brake function of the at least one traction motor,
wherein the system either:
comprises an additional module with an actuating device, wherein the main module and the additional module are connected to one another via an electrical data and/or control line, without a hydraulic connection between the main module and the additional module, or
does not have a brake pedal.

* * * * *